US011347789B1

(12) United States Patent
Morrow et al.

(10) Patent No.: US 11,347,789 B1
(45) Date of Patent: May 31, 2022

(54) RANDOMIZED COMPLIANT SEARCHING

(71) Applicant: C/HCA, Inc., Nashville, TN (US)

(72) Inventors: John William Benton Morrow, Nashville, TN (US); Deborah Reiner, Nolensville, TN (US); Lars Erik Larsen, Nashville, TN (US); Jason Draper Wood, Murfreesboro, TN (US); Kari Beam, Nashville, TN (US); David Webb, Nashville, TN (US)

(73) Assignee: C/HCA, Inc., Nashville, TN (US)

( * ) Notice: Subject to any disclaimer, the term of this patent is extended or adjusted under 35 U.S.C. 154(b) by 198 days.

(21) Appl. No.: 16/451,547

(22) Filed: Jun. 25, 2019

Related U.S. Application Data

(63) Continuation of application No. 15/888,919, filed on Feb. 5, 2018, now Pat. No. 10,380,181, which is a continuation-in-part of application No. 14/989,520, filed on Jan. 6, 2016, now abandoned, and a continuation-in-part of application No. 14/974,438, filed on Dec. 18, 2015, now abandoned.

(60) Provisional application No. 62/101,304, filed on Jan. 8, 2015, provisional application No. 62/094,811, filed on Dec. 19, 2014.

(51) Int. Cl.
| | |
|---|---|
| *G06F 16/00* | (2019.01) |
| *G06F 16/735* | (2019.01) |
| *G06F 16/248* | (2019.01) |
| *G06F 16/28* | (2019.01) |
| *G06F 16/9535* | (2019.01) |

(52) U.S. Cl.
CPC .......... *G06F 16/735* (2019.01); *G06F 16/248* (2019.01); *G06F 16/285* (2019.01); *G06F 16/9535* (2019.01)

(58) Field of Classification Search
None
See application file for complete search history.

(56) References Cited

U.S. PATENT DOCUMENTS

| | | | | |
|---|---|---|---|---|
| 5,584,024 | A | * 12/1996 | Shwartz | .............. G06F 16/2423 |
| 6,873,982 | B1 | 3/2005 | Bates et al. | |
| 6,978,263 | B2 | 12/2005 | Soulanille | |
| 8,583,450 | B2 | 11/2013 | Baker et al. | |
| 8,719,058 | B2 | 5/2014 | Bonner et al. | |

(Continued)

FOREIGN PATENT DOCUMENTS

WO 2012/160567 A1 11/2012

OTHER PUBLICATIONS

Learning to Rank with Selection Bias in Personal Search, Jul. 2016 Xuanhui Wang, Michael Bendersky, Donald Metzler, Marc Najork Google Inc.,Mountain View, CA 94043, {xuanhui, bemike, metzler, 1 O pages.

(Continued)

*Primary Examiner* — Thu Nguyet T Le
(74) *Attorney, Agent, or Firm* — Kilpatrick Townsend & Stockton, LLP

(57) ABSTRACT

In some examples, a randomization searching engine is described that enables randomized searching and recommendation of authorized user profiles. The randomization searching engine implements a search routine that identifies search results by prioritizing authorized user profiles, bucketizing authorized user profiles, categorizing authorized user profiles results, collating authorized user profiles, and generating a set of search results.

16 Claims, 18 Drawing Sheets

(56) References Cited

U.S. PATENT DOCUMENTS

| | | | |
|---|---|---|---|
| 8,983,930 | B2 | 3/2015 | Cheng et al. |
| 9,058,352 | B2 | 6/2015 | Dudala |
| 9,542,530 | B2 | 1/2017 | Nadarajah et al. |
| 10,140,288 | B2 | 11/2018 | Pestian |
| 10,185,929 | B2 | 1/2019 | Kharraz |
| 10,380,181 | B1 | 8/2019 | Morrow |
| 2004/0267735 | A1 | 12/2004 | Melham |
| 2006/0047552 | A1 | 3/2006 | Larsen |
| 2006/0047554 | A1 | 3/2006 | Larsen |
| 2008/0227063 | A1 | 9/2008 | Kenedy |
| 2010/0070295 | A1 | 3/2010 | Kharraz |
| 2012/0316911 | A1 | 12/2012 | Schwarz |
| 2013/0097093 | A1* | 4/2013 | Kolber ............... G06Q 10/1053 705/321 |
| 2014/0223480 | A1 | 8/2014 | Berry |
| 2014/0249878 | A1 | 9/2014 | Kaufman |
| 2014/0279227 | A1* | 9/2014 | Schoenberg ....... G06Q 30/0613 705/26.41 |
| 2015/0111187 | A1 | 4/2015 | Loeb, Jr |
| 2016/0086136 | A1 | 3/2016 | Pidara et al. |
| 2016/0171452 | A1 | 6/2016 | Brown |
| 2016/0188799 | A1 | 6/2016 | Borras |
| 2016/0239614 | A1 | 8/2016 | Siva |
| 2017/0161433 | A1 | 6/2017 | Perretta |

OTHER PUBLICATIONS

Finding Rare Web Pages by Relevancy and Atypicality in a Category, 2013 Takayuki Yumoto, Ryohei Tada, Manabu Nii, Kunihiro Sato, Graduate School of Engineering, University of Hyogo, 2167 Shosha, Himeji Hyogo 671-2280, Japan.

How to find your appropriate doctor*, An integrated recommendation framework in big data context, Hongxun Jiang, Wei Xu, School of Information, Renmin University of China, Beijing, 100872, P. R. China, Jun. 2014.

Non-Final Office action, dated May 14, 2018, in related U.S. Appl. No. 14/974,438, 35 pages.

Final Office Action dated Nov. 5, 2018 in related U.S. Appl. No. 14/974,438, 40 pages.

First Action Interview Pilot Program Pre-Interview Communication dated Apr. 16, 2018 in related U.S. Appl. No. 15/888,919, 6 pgs.

Notice of Allowance dated Oct. 17, 2018 in related U.S. Appl. No. 15/888,919, 26 pgs.

First Action Interview Office Action dated Jul. 3, 2018 in related U.S. Appl. No. 15/888,919, all pages.

Non-Final Office Action dated Apr. 1, 2019 in related U.S. Appl. No. 14/974,438, 43 pgs.

Final Office Action dated Dec. 4, 2019 in related U.S. Appl. No. 14/974,438, all pgs.

Final Office Action dated Dec. 5, 2019 in related U.S. Appl. No. 14/989,520, all pgs.

* cited by examiner

| Details ■ Referral - Find A Provider +

0 Recommended Providers

[Hide Search] [Exit Application]

PROVIDER INFORMATION

PROVIDER | first name | last name
SPECIALTY | Search by specialty
PROFILE | Language | Gender | Years of experience | Programs | Procedures & Conditions
FACILITY | Education | Insurances Accepted | Hospital Affiliation | Facility Name
LOCATION | Search by Street, Address, State, or Zip Code
PROXIMITY | Zip code | Select A Distance
OTHER | City Market | Facility Division

⟵ 1102

APPOINTMENT INFORMATION

WHEN | January 19, 2017

⟵ 1104

[Search]

Refer this provider?   ✕

Disposition*  ⌄
Disposition Reason*  ⌄
Reason Code*  ⌄
Comments

Save & Exit    Save & Search Again

US 11,347,789 B1

RANDOMIZED COMPLIANT SEARCHING

CROSS-REFERENCE TO RELATED APPLICATIONS

The present application is a continuation application which claims the priority benefit under 35 USC 119(e) to U.S. application Ser. No. 15/888,919, filed Feb. 5, 2018, which is a continuation-in-part application of U.S. application Ser. No. 14/974,438, filed on Dec. 18, 2015, which claims priority to U.S. Provisional Application No. 62/094,811 filed Dec. 19, 2014. U.S. patent application Ser. No. 15/888,919 is also a continuation-in-part application which claims the priority benefit under 35 USC 119(e) to U.S. application Ser. No. 14/989,520 filed Jan. 6, 2016, which claims priority to U.S. Provisional Application No. 62/101,304 filed Jan. 8, 2015. The entire disclosures of the above applications are hereby incorporated by reference, for all purposes, as if fully set forth herein.

BACKGROUND

Most search engines rely on a search index and a set of search parameters to execute searches. When a new search query is received, a search engine attempts to match the search parameters to information from the search index to identify relevant search results.

BRIEF DESCRIPTION OF THE DRAWINGS

Various examples in accordance with the present disclosure will be described with reference to the drawings, in which:

FIG. 11 is an example view relating to implementing techniques relating to performing randomized searching and recommending of authorized user profiles, according to at least one example;

FIG. 12 is an example view relating to implementing techniques relating to performing randomized searching and recommending of authorized user profiles, according to at least one example;

FIG. 14 is an example view relating to implementing techniques relating to performing randomized searching and recommending of authorized user profiles, according to at least one example;

FIG. 15 is an example view relating to implementing techniques relating to performing randomized searching and recommending of authorized user profiles, according to at least one example;

DETAILED DESCRIPTION

The ensuing description provides preferred exemplary example(s) only, and is not intended to limit the scope, applicability or configuration of the disclosure. Rather, the ensuing description of the preferred exemplary example(s) will provide those skilled in the art with an enabling description for implementing a preferred exemplary example. It is understood that various changes may be made in the function and arrangement of elements without departing from the spirit and scope as set forth in the appended claims.

Figure 1:
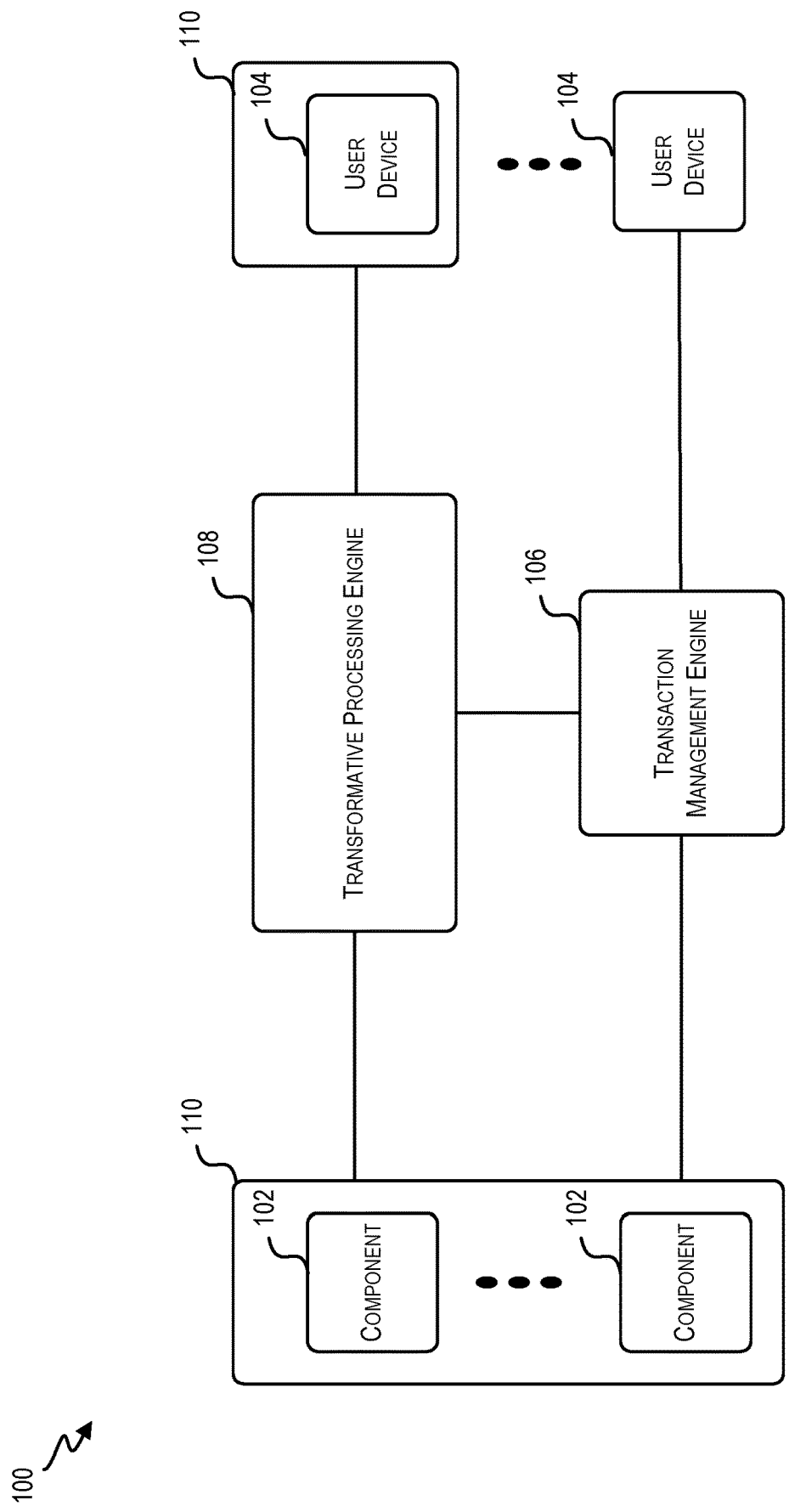
FIG. 1 is an example block diagram illustrating an environment in which techniques relating to performing randomized searching and recommending of authorized user profiles may be implemented, according to at least one example.

Referring first to FIG. 1, a block diagram of an example of an interaction system 100 is illustrated. Generally, in interaction system 100, data can be generated at one or more system components 102 and/or user devices 104. Transaction management engine 106 van manage the flow of communications within interaction system. Transformative processing engine 108 can receive, intercept, track, integrate, process and/or store such data.

Data flowing in interaction system 100 can include a set of communications. Each of one, some of all communications can include (for example) an encoding type, authentication credential, indication of a content size, identifier of a source device, identifier of a destination device, identifier pertaining to content in the communication (e.g., an identifier of an entity), a processing or reporting instruction, a procedure specification, transmission time stamp, and/or sensor measurement. Data may, or may not, selectively pertain to a particular entity and/or client. Data can, depending on the implementation, include individually identifiable information and/or de-identified information as it pertains to an entity and/or client. Data may, but need not, include protected information.

For example, a system component 102 can include, for example, a sensor to detect a sensor measurement and can thereafter generate and transmit a communication that reflects the sensor measurement. The communication may be transmitted at routine times and/or upon detecting a threshold (e.g., one or more) number of measurements or a measurement satisfying a transmission condition (e.g., exceeding a threshold value). In some instances, the sensor measurement corresponds to one reflecting a property of an object or entity (e.g., person) near the sensor. The communication may then include an identifier of the object or entity. The identifier can be determined, for example, based on detection of a nearby electronic tag (e.g., RFID tag), a detected user input received at a user interface of component 102 and/or data in a corresponding communication received from a user device.

As another example, a user device 104 can be configured to detect user input received at a user interface of the device. The user input can include, for example, an identifier of an object or entity, an instruction, a characterization of an object or entity, an identification of an assessment to be performed, a specification of an aggregation or data processing to be performed, and/or an identification of a destination for a data-analysis report. User device 104 can further be configured to detect user input requesting particular data, to generate a request communication (e.g., to be sent to transformative processing engine), to receive the requested data and/or to present the received data.

Data can include information that identifies a person, such as personal information and/or demographic information. For example, the information can identify a person's name, age, sex, race, physical address, phone number, email address and/or social security number. Data may include information collected by a government agent, employer, insurer, or school or university, that relates to a past, present, or future condition or status (e.g., pertaining to employment, political involvement, occupation, health, or financial status) of any individual. For example, data may include information about past events.

Data may identify an entity being evaluated and/or one at least partly performing an evaluation. For example, a communication may identify a first company as one being evaluated and a second company as one evaluating a quality of a product of the first company. As another example, a communication may identify a first service plan of a first company as one providing an Internet network and may identify one or more users providing speed checks over the network.

The depicted engines, devices and/or components can communicate over one or more networks. A network of one or more networks can include a wired network (e.g., fiber, Ethernet, powerline ethernet, ethernet over coaxial cable, digital signal line (DSL), or the like), wireless network (e.g., Zigbee™, Bluetooth™, WiFi™, IR, UWB, WiFi-Direct, BLE, cellular, Long-Term Evolution (LTE), WiMax™, or the like), local area network, the Internet and/or a combination thereof. It will be appreciated that, while one or more components 102 and one or more user devices 104 are illustrated as communicating via transformative processing engine 108 and/or transaction management engine 106, this specification is not so limited. For example, each of one or more components 102 may communicate with each of one or more user devices 104 directly via other or the same communication networks.

A component 102 can be configured to detect, process and/or receive data, such as environmental data, geophysical data, biometric data, chemical data (e.g., chemical composition or concentration analysis data), and/or network data. The data can be based on data detected, for example, via a sensor, received signal or user input. A user device 104 can include a device configured to receive data from a user and/or present data to a user. It will be appreciated that, in some instances, a component 102 is also a user device 104 and vice-versa. For example, a single device can be configured to detect sensor measurements, receive user input and present output.

A component 102 can be configured to generate a communication that is in one or more formats, some of which can be proprietary. For example, an imaging machine (e.g., one of one or more components 102) manufactured by company A, located within a first facility (e.g., facility 110), and belonging to a first client, may save and transfer data in a first format. An imaging machine (e.g., one of one or more components 102) manufactured by company B, located within the first facility (e.g., facility 110), and belonging to the first client, may save and transfer data in a second format. In some examples, data from certain components is transformed, translated, or otherwise adjusted to be recognizable by transformative processing engine 108. Thus, continuing with the example from above, when the imaging machines manufactured by companies A and B are located within the first facility belonging to the first client, they may nevertheless save and transfer data in different formats. In some examples, one or more components 102 communicate using a defined format.

In some examples, each of one or more components 102 are each associated with one or more clients within a same or different interaction systems. For example, certain ones of one or more components 102 may be associated with a first client, while other ones of one or more components 102 may be associated with a second client. Additionally, each of one or more components 102 may be associated with a facility 110 (e.g., client facility). Each facility 110 may correspond to a single location and/or processing focus. Exemplary types of facilities include server farm facilities, web-server facilities, data-storage facilities, technical-support facilities, telecommunication facilities, care facilities and/or business operation facilities. For example, a first facility may include a structure at a first location at which one or more resources (e.g., computational resources, equipment resources, laboratory resources and/or human resources) are provided. Each of the one or more resources may be of a first type in a first set of types. A resource type can be identified based on, for example, a characteristic of the resource (e.g., sensor inclusion) and/or a capability of providing each of one or more services. Thus, for example, resources at a first facility may be better configured for handling a particular type of service requests compared to those in another facility. As another examples, different facilities may include resources of similar or same types but may vary in terms of, for example, user accessibility, location, managing client, etc.

Transmission of data from one or more components 102 to transformative processing engine 108 may be triggered by a variety of different events. For example, the data may be transmitted periodically, upon detection of an event (e.g., completion of an analysis or end of a procedure), upon detection of an event defined by a rule (e.g., a user-defined rule), upon receiving user input triggering the transmission, or upon receiving a data request from transformative processing engine 108. Each transmission can include, e.g., a single record pertaining to a single entity, object, procedure, or analysis or multiple records pertaining to multiple entities, objects, procedures, or analyses.

In some examples, at least some of one or more user devices 104 are associated with facility 110. In some examples, at least some of one or more user devices 104 need not be associated with facility 110 or any other facility. Similar to one or more components 102, one or more user devices 104 may be capable of receiving, generating, processing and/or transmitting data. Examples of one or more user devices 104 include, for example, a computer, a mobile device, a smart phone, a laptop, an electronic badge, a set-top box, a thin client device, a tablet, a pager, and other similar user devices). One or more user devices 104 may be configured to run one or more applications developed for interacting with data collected by transformative processing engine 108. For example, those user devices of one or more user devices 104 that are not associated with facility 110 may be configured to run one or more third-party applications that may rely in part on the data gathered by transformative processing engine 108.

Each of one or more components 102 and one or more user devices 104 may be utilized by one or more users (not shown). Each of the one or more users may be associated with one or more clients. For example, one of the one or more users can be associated with a client as a result of being employed by the client, physically located at a location of the client, being an agent of the client or receiving a service from the client.

In some examples, one or more components 102 and one or more user devices 104 may communicate with transformative processing engine 108 and transaction management engine 106 via different information formats, different proprietary protocols, different encryption techniques, different languages, different machine languages, and the like. As will be discussed with reference to FIG. 2, transformative processing engine 108 is configured to receive these many different communications from one or more components 102, and in some examples from one or more user devices 104, in their native formats and transform them into any of one or more formats. The received and/or transformed communications can be transmitted to one or more other devices (e.g., transaction management engine 106, an entity device and/or a user device) and/or locally or remotely stored. In some examples, transformative processing engine 108 receives data in a particular format (e.g., the HL7 format) or conforming to any other suitable format and/or is configured to transform received data to conform with the particular format.

One or more components 102 of facility 110 can include and/or has access to a local or remote memory for storing generated data. In some examples, the data is stored by one or more servers local to facility 110. Such storage may enable facility 110 to retain locally data pertaining to its facility prior to (or in conjunction with) the data being shared with transformative processing engine 108 and/or transaction management engine 106. In some examples, the one or more servers of facility 110 share data directly with a record service (not shown), and the record service makes the data available to transformative processing engine 108 and/or transaction management engine 106. Once an electronic record is updated at facility 110, an indication of the update may be provide to the record service. The record service may then update a corresponding record associated with the electronic record.

The record service can be granted access to the data generated and/or transmitted by one or more components 102. In some examples, the record service includes a server or a plurality of servers arranged in a cluster or the like. These server(s) of the record service can process and/or store data generated by one or more components 102. For example, one or more records can be generated for each entity (e.g., each record corresponding to a different entity or being shared across entities). Upon receiving a communication with data from an component (or facility), the record service can identify a corresponding record and update the record to include the data (or processed version thereof). In some examples, the record service provides data to transformative processing engine 108.

Facility 110 can include one at which a resource is located and/or service is provided. Irrespective of the type of facility, facility 110 may update data, maintain data, and communicate data to transformative processing engine 108. At least some of the data may be stored local to facility 110.

A user interacting with a user device 104 can include, for example, a client customer, client agent and/or a third party. A user may interact with user device 104 and/or component 102 so as to, for example, facilitate or initiate data collection (e.g., by a component 102), provide data, initiate transmission of a data request, access data and/or initiate transmission of a data-processing or data-storage instruction. In some instances, one or more user devices 104 may operate according to a private and/or proprietary network or protocols. In other examples, one or more user devices 104 may operate on public networks. In any case, however, transformative processing engine 108 can have access to the one or more components and can communicate with them via a public, private and/or proprietary network or protocols. The use of one or more private and/or proprietary protocols can promote secure transfer of data.

Figure 2:
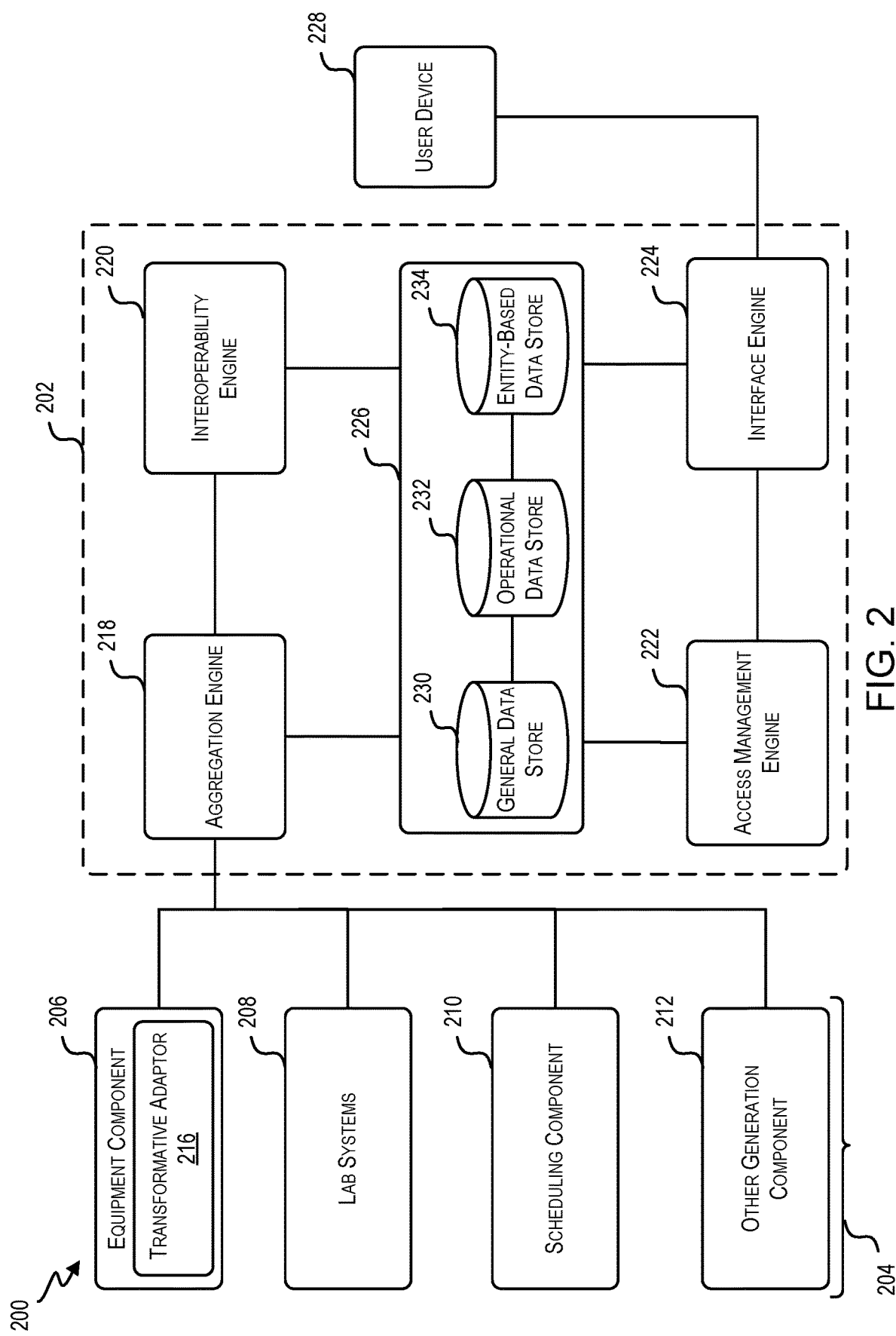
FIG. 2 is an example block diagram illustrating an environment in which techniques relating to performing randomized searching and recommending of authorized user profiles may be implemented, according to at least one example.

Referring next to FIG. 2, a block diagram of an example of an interaction system 200 is shown. Interaction system 200 includes a transformative processing engine 202. Transformative processing engine 202 is an example of transformative processing engine 108 discussed with reference to FIG. 1. Interaction system 200 also includes one or more generation components 204. In particular, one or more generation components 204 includes an equipment component 206, a lab systems component 208, a scheduling component 210 and other generation component 212. One or more generation components 204 are examples of one or more components 102 discussed with reference to FIG. 1.

Generally, one or more generation components 204 includes any suitable device or system capable of generating data in the context of an interaction system. For example, the other generation component 212 may include a sensor on a door, and equipment component 206 may include a sophisticated computer-controlled laser device. In either case, each generation component generates some type of data. For example, the data provided by the sensor may be used to address security concerns or assessing heating, ventilating, and air conditioning (HVAC) costs for an institution. The data provided by the laser device may have been provided while engaged in a procedure and may then be used by other entities in the future to decide how to use the device.

As discussed in further detail herein, data generated by one or more generation components 204 can be of a variety of formats, some of which may be proprietary. For example, a single component can generate data in multiple formats, different components can generate data in different formats, and/or different component types can result in generation of data in different formats. In some instances, formatting of a data can depend on a service having been provided, a user initiating data generation, a destination to receive the data, a location at which a service was provided, etc. In some examples, a typical interaction system includes thousands of generation components producing data in hundreds of formats. In order to harness the power that comes from such a large amount of data to make informed decisions, it is desirable that all, or at least a large portion of the data, is shared. Use of transformative processing engine 202 in accordance with techniques described herein may achieve this design—making large amounts of data, in many different originating formats available to various types of users, via one or more interfaces.

While one or more generation components 204 are illustrated adjacent to each other, it is understood that each may be located within one facility or that the components may be spread out among many facilities. In addition, in some examples, one or more generation components 204 belong to different clients.

Turning now to equipment component 206, this component includes any machine, contrivance, implant, or other similar related article, that is intended to aid in reaching a particular objective. In some instances, equipment component 206 includes one or more sensors to detect environmental or other stimuli. Equipment component 206 can include, for example, equipment to monitor a stimulus, detect stimulus changes, detect stimulus-indicative values, and so on. Exemplary equipment components 206 include an imaging device, a device that detects and characterizes electrical signals, a device that detects pressure, and/or a device that detects concentration of one or more particular elements, compounds and/or gases.

As illustrated, equipment component 206 includes transformative adaptor 216. In some examples, transformative adaptor 216 is a device that transforms, translates, converts, or otherwise adjusts output data from equipment component 206. For example, an equipment component 206 can be a scanner that outputs its results in format A, but the majority of other scanners in the interaction system output their results in format B. Transformative adaptor 216 may be implemented to convert or otherwise adjust the results in format A to conform closer to format B. For example, the conversion from format A to format B may be performed using a conversion rule, which may be user-define or learned. Transformative processing engine 202 may perform similar tasks as it relates to all data generated within interaction system 200. In this manner, transformative adaptor 216 can perform an initial step in the process of transformation, translation, conversion, or adjustment of the output of equipment component 206. In some examples, transformative adaptor 216 is implemented in hardware, software, or any suitable combination of both. In some examples, other transformative adaptors (not shown) may be implemented within others of one or more generation components 204. In some examples, equipment component 206 may not include transformative adaptor 216.

Lab systems component 208 includes any suitable laboratory equipment or system that is intended to analyze material, such as biological material. This includes, for example, laboratory equipment that analyzes biological samples; electric microscopes; ultracentrifuges; data collection devices, including Kymographs, sensors connected to a computer to collect data; monitoring devices; computers used to report results of lab tests, and other similar laboratory equipment. Each of the above-listed components generates data that is provided (directly or indirectly) to transformative processing engine 202.

Scheduling component 210 includes any suitable computing devices used for business-related purposes with respect to interaction system 200. For example, scheduling component 210 can be configured to schedule a resource for allocation for a particular entity during a particular time slot. Scheduling component 210 can monitor a schedule for the resource and can identify one or more available time slots that may be secured by a particular entity. Upon receiving a scheduling indication, scheduling component 210 may update a schedule of a resource to reflect that a particular time slot is to be allocated for service of a particular entity.

Each of one or more generation components 204 and the user device 228 may include individual and/or shared storage systems, one or more processors, a user interface, a network connectivity device, and one or more ports. The storage system include memory that may be implemented, e.g., using magnetic storage media, flash memory, other semiconductor memory (e.g., DRAM, SRAM), or any other non-transitory storage medium, or a combination of media, and can include volatile and/or non-volatile media. The storage systems may also be configured to store computer-executable code or instructions for interacting with the user interface and/or for one or more applications programs, such as an application program for collecting data generated by the particular generation component.

The one or more processors may be configured to access the operating system and application programs stored within the storage systems, and may also be configured to execute such program code. The one or more processors can be implemented as one or more integrated circuits, e.g., one or more single-core or multi-core microprocessors or microcontrollers, examples of which are known in the art. In operation, the one or more processors can control the operation of the particular component. The one or more processors may access and execute the program code and at any given time.

The user interface can include any combination of input and output devices. In some instances, a user can operate input devices of the user interface to invoke the functionality of the particular component or user device. For example, the user interface may enable the user to view, hear, and/or otherwise experience output from component or user device via the output devices of the user interface. Examples of output devices include a display, speakers, and the like.

The network connectivity device may enable the component or user device to communicate with transformative processing engine 202 and other components or other user devices via one or more networks. The one or more networks may include any suitable combination of cable, cellular, radio, digital subscriber line, or any other suitable network, which may be wired and/or wireless. In some examples, the network connectivity device may enable the component or the user device to communicate wirelessly with various other components and/or transformative processing engine 202. For example, the components may include circuitry to enable data communication over a wireless medium, e.g., using near-field communication (NFC), Bluetooth Low Energy, Bluetooth® (a family of standards promulgated by Bluetooth SIG, Inc.), Zigbee, Wi-Fi (IEEE 802.11 family standards), or other protocols for wireless data communication.

The one or more ports may enable the component or the user device to receive data from one or more sensors. The sensors may be any suitable type of sensor to capture data. Such captured data may be shared with transformative processing engine 202 in accordance with techniques described herein. In some examples, the sensors may also be configured to detect the component's or the user device's location and other details about the component or the user device. In some examples, the component and user device may include global positioning chips for determining a geolocation. Such geolocation information may be relevant to analyzing the data provided by the component or the user device located at the geographic location.

Transformative processing engine 202 includes an aggregation engine 218, an interoperability engine 220, an access management engine 222, an interface engine 224, and a data store 226. Generally aggregation engine 218 is configured to collect data from multiple communications. The data may be from one or multiple generation components 204 and/or may be of a same or different formats. Aggregation engine 218 may be configured to perform one or more operations on the collected data. For example, aggregation engine 218 may tag data, log data, perform protocol conversion, and may support one-to-many communications. The collection may be asynchronous. In some examples, the data has been saved locally in connection with one or more generation components 204 in many different formats having many different data structures.

Aggregation engine 218 can identify data to be aggregated based on, for example, intra-communication data, a current time, a source generation component, and/or one or more aggregation rules. For example, an aggregation rule may specify that data is to be aggregated across all communications that include content with a same entity identifier. An aggregation may be dynamic. For example, aggregated data may reflect that from within a most recent 12-hour period. Thus, an aggregation may be updated in time to exclude older data from the aggregation and to include newer data.

Aggregation engine 218 can be configured to provide data from one or more communications to interoperability engine 220. Interoperability engine 220 can be configured to perform one or more operations on the received data and store it in data store 226. For example, interoperability engine 220 may perform semantic tagging and indexing of data. This may include extracting field values from data, categorizing data (e.g., by type of data, characteristic of an entity, location of facility, characteristic of facility, and the like), anonymizing or partially-anonymizing data, and the like. Interoperability engine 220 may also include a high availability cache, an alerts engine and a rules engine. In some examples, interoperability engine 220 operates synchronously.

From interoperability engine 220, data flows to data store 226. Data store 226 (and any other data store discussed herein) may include one or more data stores, which may be distributed throughout two or more different locations (e.g., present on different devices, which can include devices of different entities and/or a cloud server). In some examples, data store 226 includes a general data store 230, an operational data store 232, and an entity-based data store 234. Within each of the data stores 230, 232, and 234 is stored data. Depending on the structure of the particular data store, certain data stores may include rules for reading and writing. The data stores 230, 232, and 234 may include records, tables, arrays, and the like, which may be relational or non-relational. Depending on the data store, records for individual entities, business and analytics information, output data from one or more generation components 204, and the like may be retained. The data within the data stores 230, 232, and 234 include elements or tags such that a particular data (e.g., for a single entity, protocol, etc.) can be retrieved.

Access management engine 222 is configured to manage access to features of transformative processing engine 202, including access to the data retained in data store 226. For example, access management engine 222 may verify that a user device such as user device 228 is authorized to access data store 226. To verify the user device 228, access management engine 222 may require that a user of the user device 228 input a username and password, have a profile associated with the interaction system, have paid a subscription fee associated with access to data store 226, and the like. Access management engine 222 may also verify that the user device 228 has an IP address or geographical location that corresponds to an authorized list, that the user device 228 includes a plug-in for properly accessing data store 226, that the user device 228 is running certain applications required to access data store 226, and the like.

Interface engine 224 is configured to retrieve the data from data store 226 and provide one or more interfaces for interacting with elements of transformative processing engine 202. For example, interface engine 224 includes an interface by which an application running on user device 228 can access portions of data within data store 226.

Figure 3:
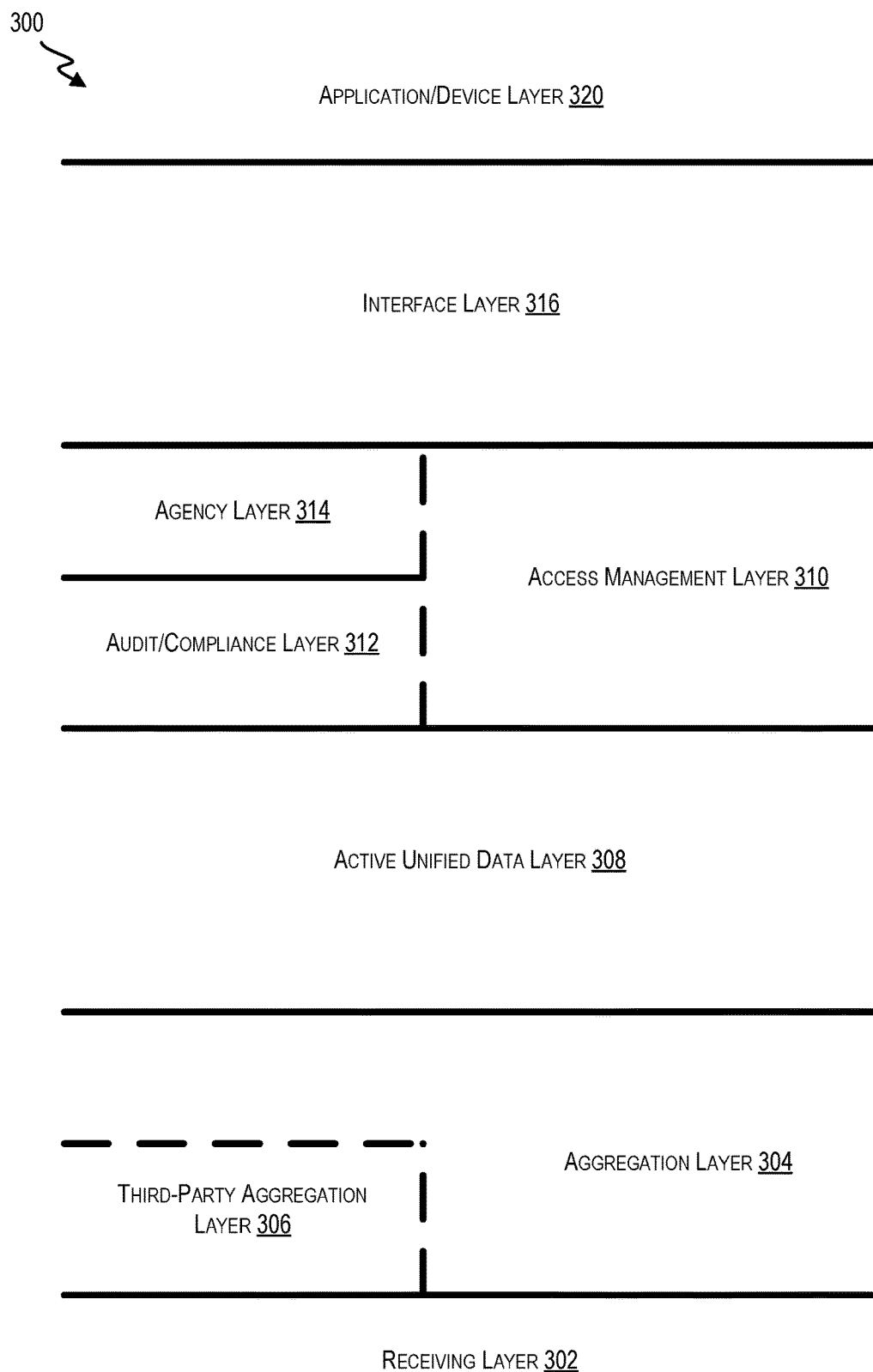
FIG. 3 is an example schematic model illustrating a network communication model in which techniques relating to performing randomized searching and recommending of authorized user profiles may be implemented, according to at least one example.

Turning next to FIG. 3, an architecture stack 300 is shown. In some examples, techniques relating management of data are implemented in accordance with architecture stack 300. And while architecture stack 300 is illustrated as having a particular structure, it is understood that other structures, including those with more or less layers than illustrated, is within the scope of this specification. In some examples, architecture stack 300 is implemented across an interaction system having a plurality of systems belonging to the same client or spread across different clients. Thus, architecture stack 300 can be used to integrate different systems of different organizations, entities, and the like and to provide a fluid sharing of information among elements within the interaction system and without the interaction system. In some instances, a multi-layer part of architecture stack 300 is implemented at a single system or device within an interaction system.

The different layers of architecture stack 300 will be described generally with reference to FIG. 3 and in detail with reference to subsequent figures. Architecture stack 300 includes a receiving layer 302 as the bottom-most layer. Receiving layer 302 includes receiving data from elements that share data with other elements within an aggregation layer 304. For example, as detailed herein, receiving layer 302 can include receiving data from generation components that generate data. As such, receiving layer 302 is where data that has been created is received. In some examples, the data within receiving layer 302 may be in its raw formats. The output may then be transmitted to aggregation layer 304. In some examples, components of receiving layer 302 may have complimentary layers to facilitate data transfer. For example, the components may include a data generation and/or a data transmission layer for providing data to receiving layer 302.

Elements of aggregation layer 304 aggregate the data generated by the elements of receiving layer 302. For example, the elements of aggregation layer 304 may include aggregation engines that collect data from generation components located within receiving layer 302. Such aggregation may be performed periodically, in response to a user request, according to a schedule, or in any other suitable manner. In some examples, data of aggregation layer 304 may be aggregated according to input and/or rules and may aggregate across records pertaining to, e.g., a facility, entity, time period, characteristic (e.g., demographic characteristic or condition), outcome, and any other suitable input and/or rules. The aggregation may include compiling the data, generating a distribution, generating a statistic pertaining to the data (e.g., average, median, extremum or variance), converting the data, transforming the data to different formats, and the like.

Next, architecture stack 300 includes an active unified data layer 308. Elements of active unified data layer 308 receive data from the elements of the other layers and store such data in a unified manner. In some examples, this may include storing the data in a manner that allows for later searching and retrieval using a defined set of method calls, techniques, and or procedures. For example, the data may be stored such that a different application can access the data in a standard or unified manner. Thus, elements of active unified data layer 308 may receive information collected or generated within aggregation layer 304 and make certain adjustments to the data (e.g., translations, tagging, indexing, creation of rules for accessing the data, conversion of formatting of the data, generation of compressed versions, and the like) prior to retaining the data within one or more data stores accessible within active unified data layer 308.

Architecture stack 300 also includes an access management layer 310, which can include an audit/compliance layer 312 and/or an agency layer 314. Access management layer 310 includes elements to manage access to the data. For example, access management layer 310 may include elements to verify user login credentials, IP addresses associated with a user device, and the like prior to granting the user access to data stored within active unified data layer 308.

Audit/compliance layer 312 includes elements to audit other elements of architecture stack 300 and ensure compliance with operating procedures. For example, this may include tracking and monitoring the other elements of access management layer 310.

Agency layer 314 includes an access location (e.g., a virtual private network, a data feed, or the like) for elements of agencies that are interested in the operations of the interaction system in which architecture stack 300 is implemented. For example, agency layer 314 may allow a governmental entity access to some elements within architecture stack 300. This may be achieved by providing the governmental entity a direct conduit (perhaps by a virtual private network) to the elements of access management layer 310 and the data within active unified data layer 308. Audit/compliance layer 312 and agency layer 314 are sub-layers of access management layer 310.

Architecture stack 300 also includes interface layer 316. Interface layer 316 provides interfaces for users to interact with the other elements of architecture stack 300. For example, clients, entities, administrators, and others belonging to the interaction system may utilize one or more user devices (interacting within application/device layer 320) to access the data stored within active unified data layer 308. In some examples, the users may be unrelated to the interaction system (e.g., ordinary users, research universities, for profit and non-profit research organizations, organizations, and the like) and may use applications (not shown) to access the elements within architecture stack 300 via one or more interfaces (e.g., to access data stored within active unified data layer 308). Such applications may have been developed by the interaction system or by third-parties Finally, architecture stack 300 includes application/device layer 320. The application/device layer 320 includes user devices and applications for interacting with the other elements of architecture stack 300 via the elements of interface layer 316. For example, the applications may be web-based applications, entity portals, mobile applications, widgets, and the like for accessing the data. These applications may run on one or more user devices. The user devices may be any suitable user device as detailed herein.

Figure 4:
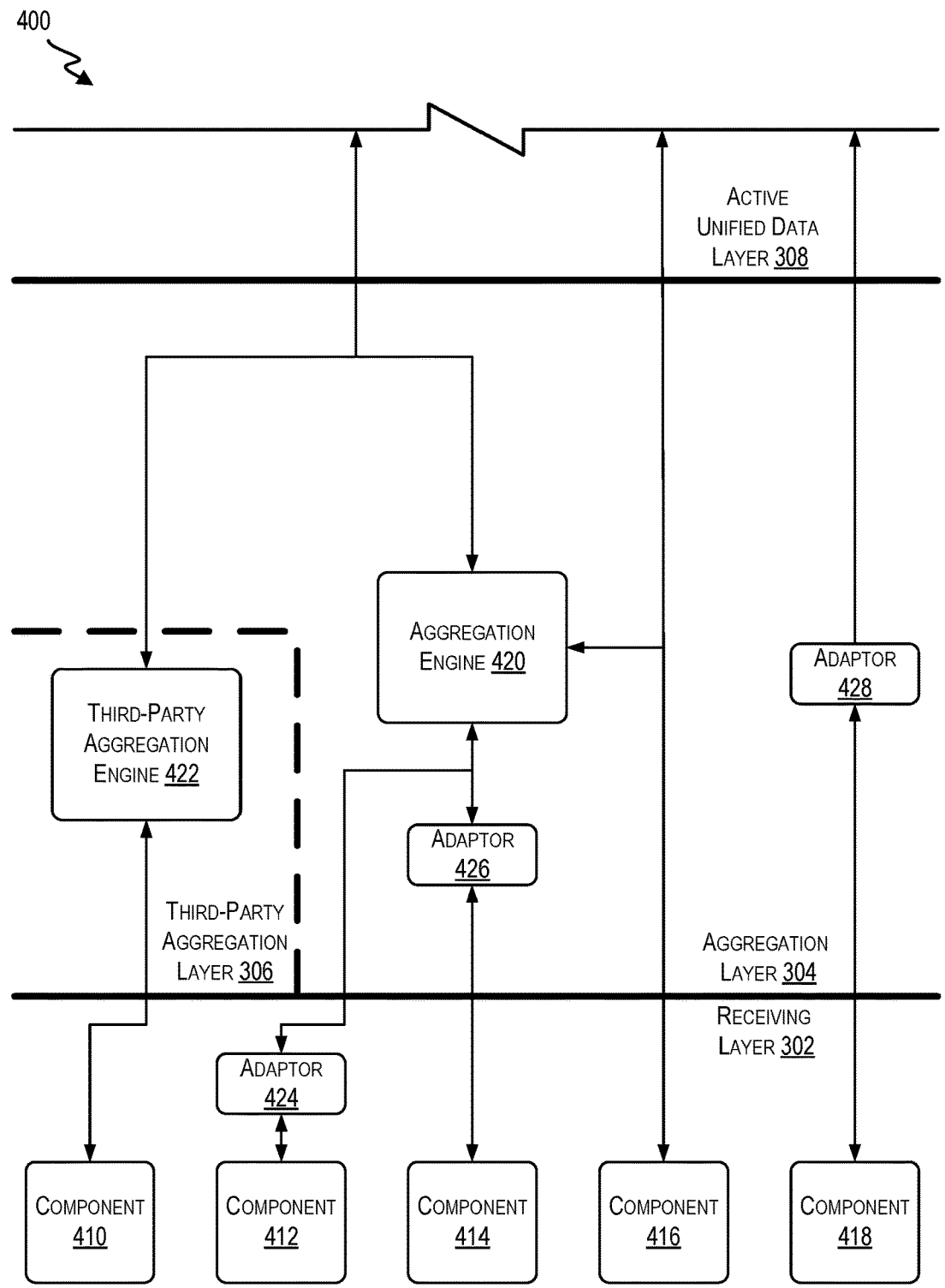
FIG. 4 is an example schematic model illustrating an aspect of the network communication model of FIG. 3 in more detail.

Turning next to FIG. 4, a diagram 400 is shown that depicts a portion of architecture stack 300 according to an example of the invention. In particular, the diagram 400 includes receiving layer 302, aggregation layer 304, aggregation layer 306, and a portion of active unified data layer 308. Receiving layer 302 receives data from one or more components 410-418.

Components 410-418 are examples of one or more generation components 204. Components 410-418 may be spread across multiple facilities within a single or multiple clients. In some examples, components 410-418 may include complimentary layers to facilitate data transmission. For example, components 410-418 may include a transmission layer, generation layer, and/or a receiving layer to communicate data at receiving layer 302 and, in some examples, receive data from receiving layer 302.

In some instances, two or more of components 410-418 generate data according to different formats. The data can then be transformed, translated, or otherwise adjusted before an aggregation engine 420 (e.g., aggregation engine 218) or a third-party aggregation engine 422 (e.g., aggregation engine 218) collects the data. In some examples, the adjustment takes place within receiving layer 302. Thus, an adaptor 424 is associated with component 412 located in receiving layer 302. Adaptor 424 is an example of transformative adaptor 216. Adaptor 424 is implemented, as appropriate, in hardware, software, or any suitable combination of both. For example, transformative adaptor 216 may be a bolt-on adaptor that adjusts data as such data leaves component 412.

Other adaptors, such as adaptor 426 and adaptor 428, are implemented within aggregation layer 304. These adaptors can function in a similar manner as adaptor 424. In some examples, the data provided by component 414 is transmitted through adaptor 426 prior to being directed to aggregation engine 420. The data provided by component 416 is transmitted through aggregation layer 304 and/or enters aggregation engine 420 without having first traveled through an adaptor. The data provided by component 418 is transmitted through aggregation layer 304 and through adaptor 428. In some examples, component 418 provides for streaming of data. The data provided by component 410 is transmitted directly to third-party aggregation engine 422.

Aggregation engine 420 and third-party aggregation engine 422 function in a similar manner. In some examples, third-party aggregation engine 422 is operated by a different entity than the entity that operates aggregation engine 420 and may belong to different clients or a different interaction system. This may be because the data collected by third-party aggregation engine 422 differs in some way from the data collected by aggregation engine 420. In any event, aggregation engine 420 is configured to perform integration of data, including generic integration. For example, aggregation engine 420 performs one or more operations on data including tagging, logging, and protocol conversion. Aggregation engine 420 also supports one-to-many communications of data. In some examples, data flows between aggregation engine 420, the third-party aggregation engine 422, and some of components 410-418 and elements of active unified data layer 308.

Figure 5:
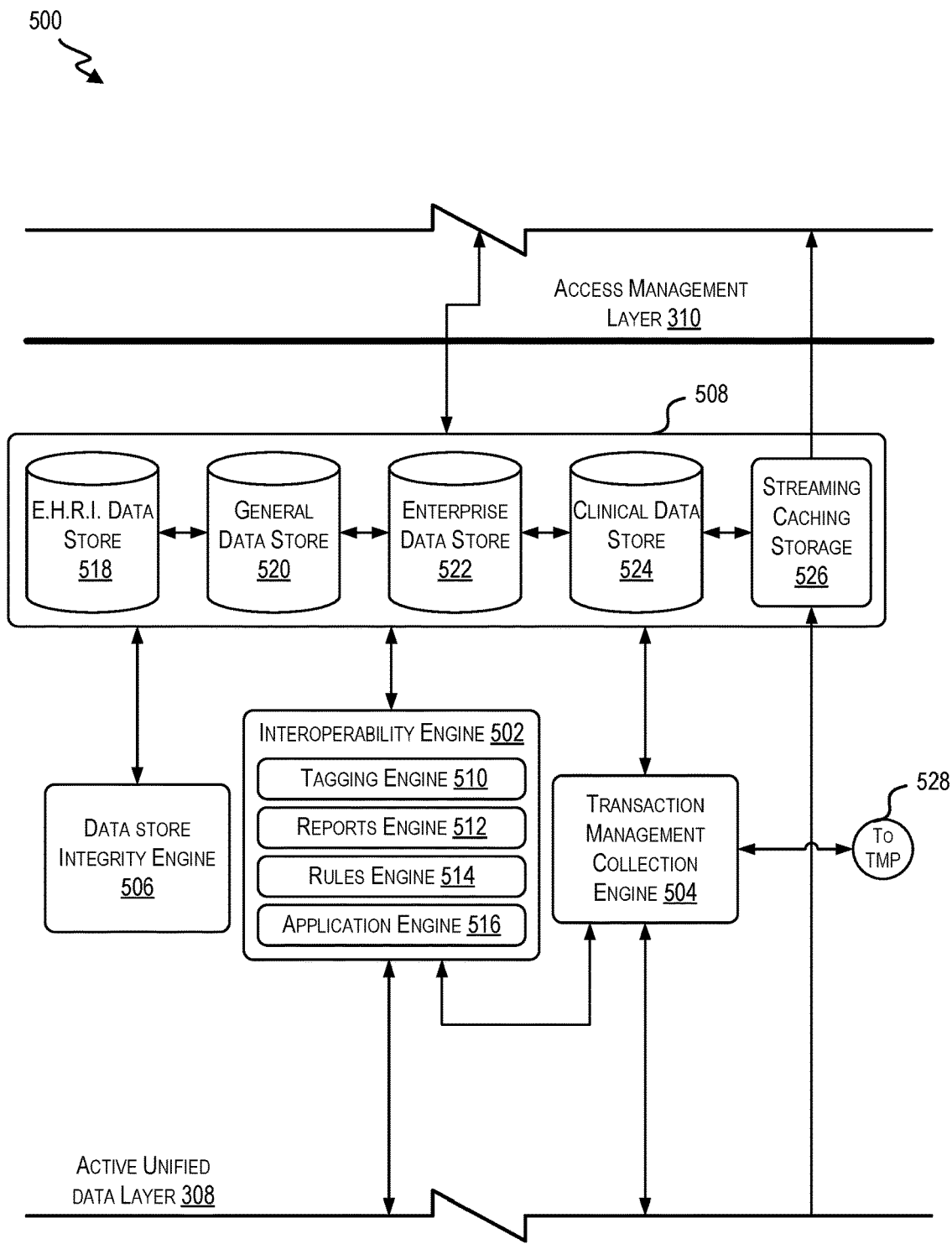
FIG. 5 is an example schematic model illustrating an aspect of the network communication model of FIG. 3 in more detail.

Referring next to FIG. 5, a diagram 500 is shown that depicts a portion of architecture stack 300 according to an example of the invention. In particular, diagram 500 includes active unified data layer 308 and a portion of access management layer 310. Active unified data layer 308, as illustrated in diagram 500, includes an interoperability engine 502 (e.g., interoperability engine 220), a transaction management collection engine 504, a data store integrity engine 506, and a data store 508 (e.g., data store 226). Generally, interoperability engine 502 receives data from elements within aggregation layer 304 (e.g., from aggregation engine 420) and performs one or more operations with respect to the data. Interoperability engine 502 also facilitates storage of at least a portion of the processed information in data store 508.

Transaction management collection engine 504 is implemented as part of transaction management engine 106. Transaction management collection engine 504 is configured to generate message indicators identifying flows of data by and between elements of an interaction system implemented using the techniques described herein. The flows of information include messages which include data, and the message indicators include unique message identifiers that can be used to identify the messages. The unique message identifiers include information that can be used to uniquely identify the messages. For example, a unique message identifier for a particular message can include a concatenation of the following information stored in a table: a source application, a facility, a message type, and a message control identification (ID). The unique message identifier can also be the message control ID. The unique message identifier may be created as messages including data are transmitted from aggregation layer 304. The table may be stored in association with the transaction management platform 528.

In some examples, the table also includes information for tracking the progress of the message from an origination node to a destination node. For example, typically when a message (e.g., any communication of data) is first received by transformative processing engine 108 (e.g., interoperability engine 502), transaction management engine 106 (e.g., transaction management collection engine 504 of transaction management engine 106) may generate a unique identifier for the message in order to track that message as it moves throughout the interaction system. The unique identifier may be included in the header of the message such that when the next node (e.g., component, device, server, etc.) after transformative processing engine 108 receives the message, that node can report back to transaction management engine 106 that it saw the message. In this manner, transaction management engine 106 may enable end-to-end tracking of messages for the life of the message.

In one example, the messages are requests. The requests may be generated based om user input at one of the components. The requests may be received by transformative processing engine 108 and integrated into the system. In some examples, transaction management engine 106 may be notified that the requests have been received and may therefore be configured to generate message IDs for each request. These message IDs may then be associated with each of the requests. As the requests continue to move throughout the interaction system (e.g., away from transformative processing engine 108), transaction management engine 106 may be track their movement using the message IDs. If one of the requests does not make it to its destination, transaction management engine 106 (or part of the transaction management platform 528) may determine why the request was stopped. In some examples, this cause may be hardware related (e.g., an unplugged Ethernet cable, a broken router, etc.), software related (e.g., a router routing to the wrong location), or any other reason for orders not arriving at their correct destination.

In some examples, transaction management engine 106 (e.g., transaction management collection engine 504 of transaction management engine 106) may receive the message and/or message identifier directly from one of components 410-418. For example, one of components 410-416 may be configured to generate the unique message identifier and/or communicate directly with transaction management engine 106. The message also may travel via one or more intermediate nodes on its way to the destination node. In some examples, a node is a component such as components 410-418, which may be running an application. In some examples, the unique identifier and the routing of the message to its destination may be stored in a table that also includes: a geolocation of each node, a network from which the message originated, a type of node, the unique node identifier, and a time associated with the message leaving the origination node. In some examples, transaction management collection engine 504 provides unique message identifiers to other elements of the interaction system to monitor the messages as they move throughout the interaction system. Transaction management collection engine 504 also provides a portion of the unique message identifiers to a transaction management platform (indicated by a circle 528) for further analysis of the message identifiers. Such analysis may include reconciliation of lost messages, latency reporting, audit management and compliance, and other such analyses.

As mentioned previously, interoperability engine 502 is configured to store data in data store 508. A plurality of sub-engines 510-516 of interoperability engine 502 are configured to perform operations relating to storing data in data store 508.

Interoperability engine 502 includes a tagging engine 510 configured to perform semantic tagging and indexing of data. Tagging engine 510 therefore is configured to receive data, read metadata associated with the data, semantically scan the content of the data, and associate one or more tags with the data. Tagging engine 510 may therefore have access to hundreds, thousands, or even more possible tags. These tags may have been input by users, learned, pre-defined, generated by outside third-party mapping sources, and/or gathered from other components and/or data stores of the interaction system. For example, if the data is a chart for an entity, the tagging engine may be configured to read any metadata associated with the chart to determine which tags may be appropriate to associate with the chart. From the metadata, tagging engine 510 may determine that the chart is for a type of entity by reading metadata indicating that an author field is populated with the name of another particular type of entity. Tagging engine 510 may have access to other data to compare the analyzed metadata against (e.g., to identify that the author's name corresponds to Dr. Brown who is an oncologist). Other examples, of metadata that may be included in one or more fields include author, document type, creation time and date, last update time and date, upload time and data, geographic location, unique ID associated with the client or facility where the data originated, and other similar fields. The tags may be stored in association with the data (e.g., the chart) and/or may be stored independent from the data but include an identifier such that when searching tags the data may be capable of population.

Continuing with the example from above, if the data is a chart for a first type of entity, tagging engine 510 may be configured to read the content of the chart to determine which tags may be appropriate to associate with the chart. For example, this may comprise analyzing the content of the chart (i.e., individual pages) semantically to look for artifacts (e.g., keywords, phrases, and the like) in the content. These artifacts may be identified by tagging engine 510 and used to decide which tags to associate with the document. In some examples, semantic scanning may involve filtering out words (e.g., articles, such as "a" and "the"), phrases, and the like. Similar to the reading of metadata, the tags may be pre-defined, user-defined, learned, and the like. In some examples, reading metadata associated with messages may provide meaning and/or give context to the particular record of data. This meaning and/or context may assist tagging engine 510 to determine one or more tags to associate with the data. The tags may be chosen, for example, based on values of particular fields in the data, detecting a frequency of one or more words in a document or metadata and/or of a set of related words (e.g., tagging a record with "cancer" upon detecting words such as tumor, metastasize, chemotherapy, radiation, oncology, malignant, stage 3, etc.). In this manner, tagging engine 510 may also index portions of the data within one or more data stores of data store 508. In some examples, such indexing may be based in part on the selected tags.

Interoperability engine 502 also includes a reports engine 512 configured to generate one or more reports or alerts based on data. For example, reports engine 512 may generate reports when certain types of data are received or when data with certain characteristics is received. Reports engine 512 may also generate alerts. The reports and/or alerts generated by reports engine 512 may be outputted in the form of one or more communications to an administrator, an authorized user, or other similar user via a user device. Such communications can include, for example, signals, sirens, electronic notifications, popups, emails, and the like. Content of such communications may include information characterizing a performance metric, efficiency and/or outcomes; identifying concerning patterns; identifying losses of data; and the like. In some examples, the content is presented in the form of one or more documents, tables, figures, charts, graphs, and the like.

Interoperability engine 502 also includes a rules engine 514 configured to create and manage business rules, condition-response rules, alert/reports rules, data-formatting rules, data-sharing rules, transmission rules, aggregation rules, user authorization rules, and other similar rules. Such rules may be user-defined, fixed, learned by elements of the interaction system, and any combination of the foregoing. Finally, interoperability engine 502 includes an application engine 516 configured to provide service-oriented architecture web services.

Data store 508 includes an electronic record information data store 518 ("record data store 518"), a general data store 520, an operational data store 522, an entity-based data store 524, and a streaming caching storage 526. While data store 508 is illustrated as including a fixed number of data stores and storage elements, it is understood that data store 508 can include any suitable number of data stores and storage elements, including more than illustrated or less than illustrated.

In some examples, a data query script is provided to query a first data store and/or to obtain data for populating a data store. Such script could query a data store described herein (e.g., data store 508) and/or could be used to obtain data to populate a data store described herein (e.g., data store 508). In one instance, the script is configured to be repeatedly executed, so as to repeatedly draw data from a source data store. The retrieved data can then be formatted, filtered, sorted and/or processed and then stored, presented and/or otherwise used. In this manner, the script can be used to produce streaming analytics.

In some instances, the data query script, when executed, identifies each of the data stores of interest. Identifying the data stores of interest involves identifying at least a portion of data from the data stores simultaneously and/or sequentially. For example, the script can identify corresponding data stores (e.g., or components of a single data store or multiple data stores) that pertain to one or more similar variables but that differ in one or more other variables. Once the portion of the data from the data stores is identified, a representation of the identified data can be output to one or more files (e.g., Extensible Markup Language (XML) files) and/or in one or more formats. Such outputs can then be used to access the data within one or more relational database accessible using Structured Query Language (SQL). Queries made using SQL can be made sequentially or in parallel. Results from an SQL query may be stored in a separate database or in an XML file that may be updated either in part or as a whole. The data query script may be executed periodically, in accordance with a user-defined rule, in accordance with a machine-defined or machine-learned rule, and in other suitable manner.

Within record data store 518 is retained data including electronic record information. In some examples, the information within record data store 518 is organized according to entity identifying information. Thus, record data store 518, in some examples, includes individually identifiable information. But it may also include de-identified information.

Within general data store 520 is retained data. The data may be stored in a relational database format or in any other suitable format. Thus, the data within general data store 520 may be retained in a data structure that includes one or more tables capable of accessing each other. In some examples, general data store 520 includes a subset of the information that is included in operational data store 522.

Within operational data store 522 is retained data in a relational database format. Thus, the data within operational data store 522 may be retained in a data structure that includes one or more data structures (e.g., tables) capable of accessing each other. Operational data store 522 is an example of an operational data warehouse. In operational data store 522 is joined many different types of data. In some examples, the operational data ware house 522 includes data pertaining to decision making as discussed herein and other data typically used by conventional business concerns.

Within entity-based data store 524 is retained data in a non-relational database format. Thus, the data within entity-based data store 524 may be retained in a structure other than tables. Such structure may be appropriate for large and complex data sets. In some examples, entity-based data store 524 (or any other data store) may be a unified system, which may include: a document-centric, schema-agnostic, structure-aware, clustered, transactional, secure, database server with built-in search and a full suite of application services. An example of such a unified system may be Marklogic. Entity-based data store 524 can support data aggregation, data organization, data indexing, data tagging and mapping to semantic standards, concept matching, concept extraction, machine learning algorithms, concept discovery, concept mining, and transformation of personal record information. In some examples, entity-based data store 524 includes data pertaining to decision making (similar to general data store 520) as discussed that is organized and accessed in a different manner. For example, the data within entity-based data store 524 may be optimized for providing and receiving information over one or more information exchanges. In some examples, entity-based data store 524 includes a subset of the information that is included in operational data store 522.

Finally, in some examples, streaming caching storage 526 is a streaming data cache data store. As discussed previously, certain components of components 410-418 may support streaming data to other components or user devices. Streaming caching storage 526 is a location where streaming data can be cached. For example, assume that component 418 is a piece of equipment operating at Location A and that a user using a computer in Location B desires to view a live of substantially live stream of outputs of the piece of equipment. Component 418 can send a portion of data to streaming caching storage 526 which can retain the portion of the data for a certain period of time (e.g., 1 day). Thus, streaming caching storage 526 is configured to cache data that can be streamed.

Diagram 500 also includes data store integrity engine 506. In some examples, data store integrity engine 506 is configured to ensure integrity of the information within data store 508. For example, data store integrity engine 506 applies one or more rules to decide whether information within all or part of data store 508 should be scrubbed, removed, or adjusted. In this manner, confidence is increased that the information within data store 508 is accurate and current.

Figure 6:
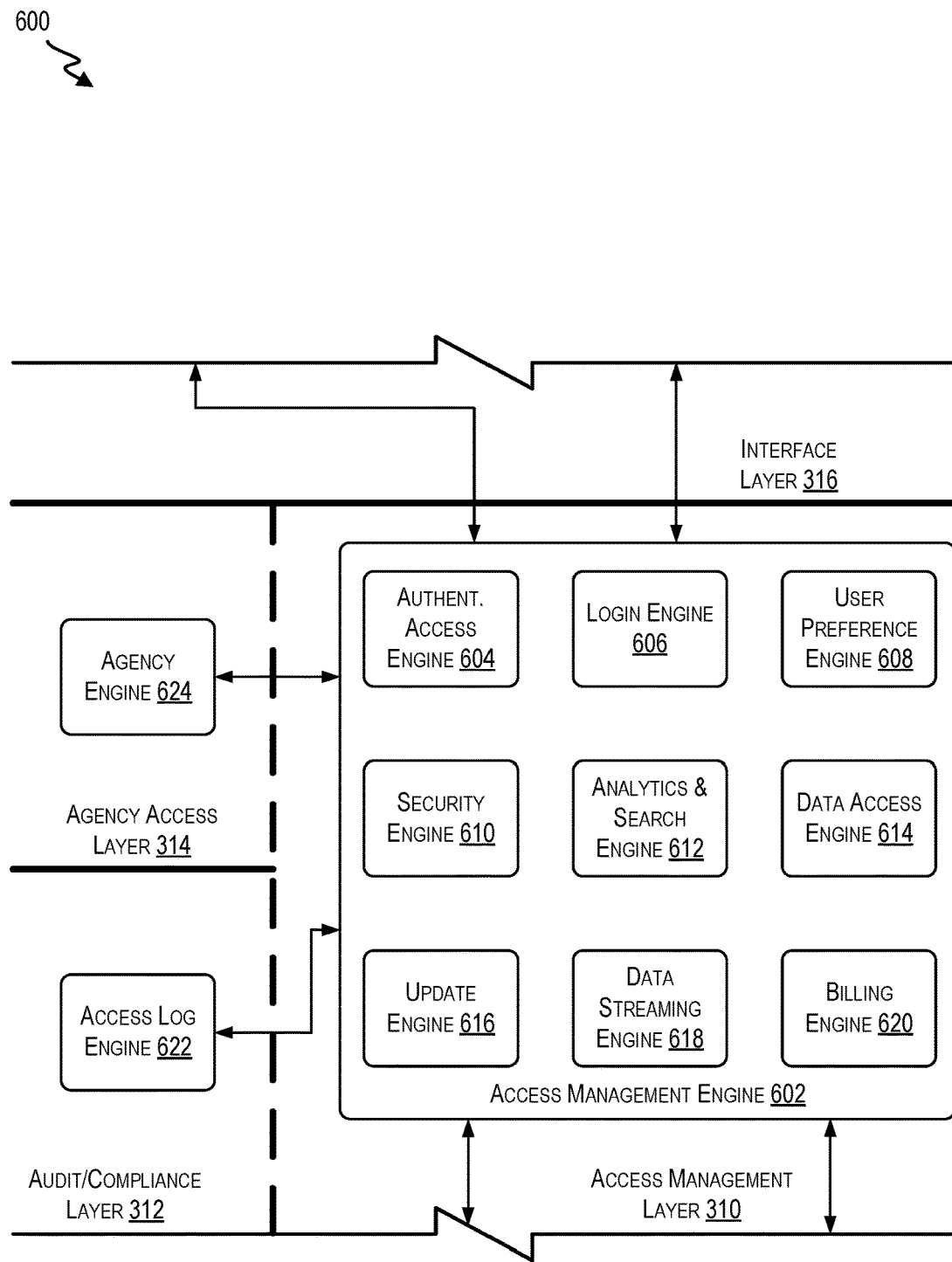
FIG. 6 is an example schematic model illustrating an aspect of the network communication model of FIG. 3 in more detail.

FIG. 6 shows a diagram 600 which depicts a portion of architecture stack 300 according to an example of the invention. In particular, the diagram 600 includes access management layer 310, audit/compliance layer 312, agency layer 314, and a portion of interface layer 316.

Access management layer 310, as illustrated in the diagram 600, includes an access management engine 602. Access management engine 602 is an example of access management engine 222. Generally, access management engine 602 can be configured to manage access to elements of transformative processing engine 202 by different components, applications, and user devices.

Access management engine 602 within access management layer 310 also provides functionality similar to an operating system. For example, access management engine 602 includes a plurality of engines configured to manage different aspects of interacting with elements of the interaction system. For example, a user who desires to access portions of data retained in data store 508, may do so by interacting with access management engine 602 using one or more applications (not shown). Thus, access management engine 602 includes a variety of engines to enable such interaction. The engines include, for example, an authentication access engine 604, a login engine 606, a user preference engine 608, a security engine 610, an analytics and search engine 612, a data access engine 614, an update engine 616, and a streaming data engine 618. The different engines of access management engine 602 can define routines, protocols, standards, and the like for interacting with elements of the interaction system.

Beginning first with authentication access engine 604, authentication access engine 604 evaluates the rules and conditions under which users may access elements of the interaction system; in particular, the conditions under which users may access data within data store 508. These rules and conditions may be user-defined (e.g., by an administrator or reviewer), learned over time, and/or may be dynamically updated and/or evaluated based on characteristics of the user or the user's device attempting to access the interaction system. The rules and conditions may indicate the types of users who have particular types of access within the interaction system. The type of access may also relate to the degree to which data is identified/de-identified. In some examples, a user desiring access to data provides certain identifying information and authentication access engine 604 authenticates an identity of the user.

Login engine 606 evaluates the rules and conditions under which users are able to log in to the interaction system or access applications associated with the interaction system. These rules and conditions may be user-defined (e.g., by an administrator), learned over time, and also may be dynamically updated and/or evaluated based on characteristics of the user or the user's device attempting to access the interaction system. Thus, while authentication access engine 604 evaluates the rules to determine which users may access the interaction system, login engine 606 evaluates the particular credentials, profiles, etc. of the users. For example, login engine 606 can confirm that an entered username (e.g., and password), provided biometric data or code or identifier in a scanned tag or badge matches that in an authorized user data structure.

Login engine 606 evaluates one or more user profiles associated with each authenticated user. In some examples, a user profile includes a username, password, and other information associated with the user. For example, a user profile may indicate characteristics about the user.

User preference engine 608 evaluates the rules and conditions under which user are able to store and update one or more user preferences corresponding to access of the interaction system or access to applications associated with the interaction system. These rules and conditions may be user-defined (e.g., by the user or administrator), and may include rules for default preferences. For example, using user preference engine 608, a user may indicate a format in which the user prefers to receive outputted information, display characteristics of a graphical user interface associated with the user, and other similar user preference settings. For example, the user may indicate that certain types of reports and/or alerts are to be sent to the user.

Security engine 610 evaluates the rules and conditions for ensuring the security of access to the elements of the interaction system. In some examples, these rules and conditions are determined by administrators of the interaction system. In some examples, security engine 610 provides a plurality of computer virus protection services. These services can be called up and implemented when accessing the interaction system or accessing applications associated with the interaction system. The rules and conditions may be based on roles, based on profiles, based on domains, and any other suitable security configuration. For example, because the interaction system may include sensitive data, security engine 610 may enforce a domain-based rule that protects certain sensitive information (e.g., identifying information).

Analytics and search engine 612 evaluates the rules and conditions under which users can search for data within the interaction system and access analytics relating to the interaction system. In some examples, these rules and conditions are user-defined or learned over time in accordance with search engine optimization techniques. For example, analytics and search engine 612 is used to search within data store 508 for particular data. Analytics and search engine 612 supports any conventional searching algorithms. For example, search engine 612 can be used to search within various fields and potential field values. In some examples, search engine 612 can provide analytics, such as statistics, graphs, distributions and/or comparative analysis pertaining to particular entities and/or characteristics. Such information may be selected by a user and presented on a user interface.

Data access engine 614 evaluates the rules and conditions under which users may operation in order to access particular data within data store 508. In some examples, these rules and conditions are user-defined or learned over time. For example, data access engine 614 may indicate the routines, subroutines, or other logic needed for an application to access certain portions of data store 508. For example, while authentication access engine 604 and login engine 606 may manage which users can access parts of the interaction system, data access engine 614 may manage how authenticated users access data within data store 508. To this end, data access engine 614 may enforce and/or evaluate certain rules managing how users access different components of the interaction system. In some examples, data access engine 614 may be used to actually access data within data store 508 (e.g., extract, download, or otherwise access). In some examples, data access engine 614 may define procedures, protocols, and the like for accessing data. The protocols and procedures for accessing data access engine 614 (like the other engines of access management engine 602) may be provided to developers in the form of a software development kit (SDK). SDKs may enable developers write applications that can effectively communicate with elements (e.g., data store 508) of the interaction system. In particular, applications that can access a portion of the data stored within active unified data layer 308.

Update engine 616 evaluates the rules and conditions for providing updates to other engines within access management engine 602, plug-ins for applications that access the interaction system, and for other similar elements of the interaction system. For example, updates may be generated at runtimes, at defined time intervals, upon request by a user, upon receiving a threshold quantity of new or changed data. Once an update is performed, an interface may be refreshed, a report may be sent indicating that the update was successful or unsuccessful, or the like.

Streaming data engine 618 defines the rules and conditions for enabling streaming of data between components and user devices of the interaction system. For example, streaming data engine 618 may enable component 414 to stream data. Streamed data may include live or substantially live audio or video feeds, results of tests, output from equipment or devices, and any other suitable type of data capable of being streamed. In some examples, the data may be streamed to other components or user devices within the network or outside the network. In order to establish a streaming transmission, streaming data engine 618 may identify a streaming destination and a streaming origin. Next, streaming data engine 618 may pair the two and enable streaming. This may include allocated bandwidth within one or more network devices associated with the interaction system. Streaming data engine 618 may also adjust the quality of the streaming data based on the availability of bandwidth. In some examples, streaming data engine 618 may receive incoming streams (and continuously present the stream or monitor for particular data (e.g., exceeding a threshold, exhibiting an above-threshold change, having a particular value)).

Within audit/compliance layer 312 is located an access log engine 622. Access log engine 622 evaluates the rules and conditions for logging access to the interaction system by users, applications, devices, and the like. Logging access includes, in some examples, logging data conventionally collected by access log engines running in similar environments. Access log engine 622 can use this data to generate and transmit reports, for example, to stakeholders of the interaction system such that they can make informed decisions regarding that is accessing the interaction system and for what purposes.

Within agency layer 314 is located an agency engine 624. Agency engine 624 evaluates the rules and conditions under which agencies can access the interaction system. For example, agencies that may use agency engine 624 include agencies to which the interaction system provides compliance, tracking, or other reporting information. For example, agency engine 624 may be used to track one or more performance indicators identified by a government agency and/or to provide report instances of defined types of events. Thus, in some examples, a government agency uses agency engine 624 to collect data pertaining to compliance of the interaction system with one or more statutes or regulations. In some examples, a university is an agency that uses agency engine 624 to collect data pertaining to one or more studies. In some examples, agency engine 624 can identify one or more entities (e.g., governmental agencies) that are to receive reports pertaining to operations or events and what types of data are to be reported to those entities. Agency engine 624 can then collect the pertinent data, potentially format and/or analyze the data, and facilitate transmission of (e.g., raw, formatted and/or analysis of) the data to the appropriate agency.

Figure 7:
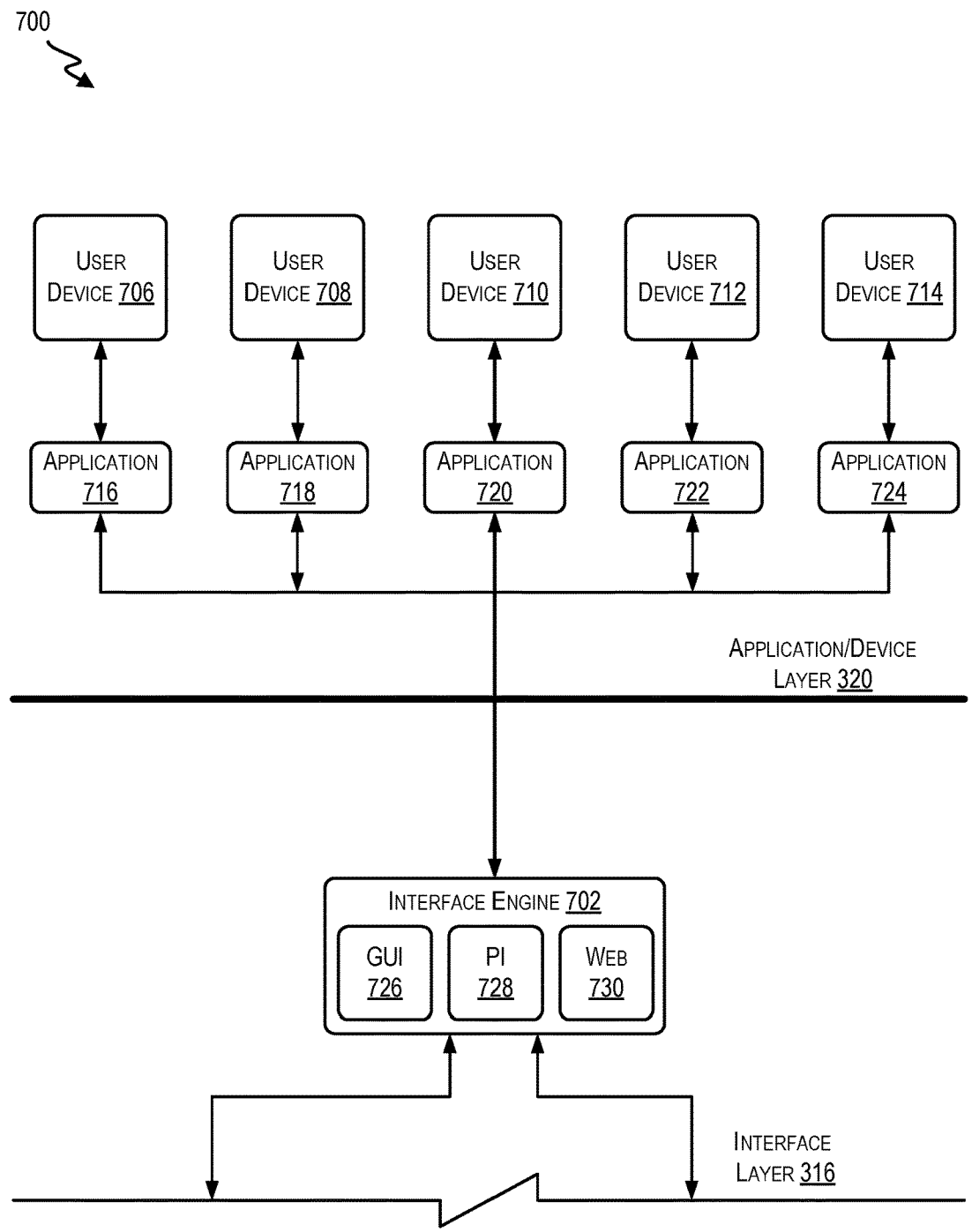
FIG. 7 is an example schematic model illustrating an aspect of the network communication model of FIG. 3 in more detail.

FIG. 7 shows a diagram 700 which depicts a portion of architecture stack 300 according to an example of the invention. In particular, diagram 700 includes interface layer 316, and application/device layer 320. Within interface layer 316 is located interface engine 702 (e.g., interface engine 224). Interface engine 702 is configured to generate one or more interfaces (e.g., graphical user interface 726, programmatic interface 728, and/or web interface 730) to enable data to flow to user devices 710, 712, and 714 via respective applications 720, 722, and 724. In some examples, the interfaces of interface engine 702 are embodied in hardware, software, or some combination of both. Within interface layer 316 communications and inputs directed to interacting with elements of access management layer 310 may be embodied.

Graphical user interface 726 is any suitable graphical user interface configured to interact with elements of the interaction system. Programmatic interface 728 includes an application programming interface, a programmatic user interface, and other similar interfaces for defining core functions for accessing elements of the interaction system. For example, programmatic interface 728 may specify software components in terms of their operations. Web interface 730 is any suitable web interface configured to interact with elements of the interaction system. Any of the interfaces described herein may be configured to receive user input, present dynamic presentations that depend on user input, and otherwise respond to user input. In some examples, such input may be provided via one or more input devices (e.g., a keyboard, touchscreen, joystick, mouse, microphone, devices capable of capturing inputs, and the like) operated by one or more users of user devices 706-714. Output may be provided via one or more output devices (e.g., a display or speaker).

Interface engine 702 is utilized by applications internal to the interaction system and external to the interaction system to access data. In some examples, the applications that are internal include applications that are developed for internal use by various entities associated with the interaction system. In some examples, the applications that are external to the interaction system include applications that are developed for external use by those that are not associated with the interaction system.

Generally, within application/device layer 320, applications 716-724 which communicate with other elements of architecture stack 300 using the interfaces generated by interface engine 702 are defined. This includes detailing how applications 716-724 are to interact with the interfaces generated by interface engine 702 for accessing data. For example, interacting may include accepting inputs at user devices 706-714 to access data and, in response, providing the data, prompts, or other types of interaction with one or more users of the user devices 716-714. Thus, applications 716-724 may be related to one or more of the interfaces generated by interface engine 702. For example, application 720 may be interact with a graphical user interface (whether generated by interface engine 702 or otherwise) to interact with other elements of the interaction system. Interacting may include receiving inputs at the graphical user interface via application 720, providing output data to the graphical user interface application 720, enabling interaction with other user devices, other applications, and other elements of the interaction system, and the like. For example, some of the inputs may pertain to aggregation of data. These inputs may include, for example, types of data to aggregate, aggregation parameters, filters of interested data, keywords of interested data, selections of particular data, inputs relating to presentation of the data on the graphical user interface, and the like. Providing output data may include providing the aggregated data on the graphical user interface, outputting the information to one of the other user devices 706-714 running one of the other applications 716-724.

Turning now to the details of applications 720, 722, and 724. In some examples, applications 720, 722, and 724 include a variety of different applications that can be designed for particular users and/or uses. In one example, application 720 includes dashboards, widgets, windows, icons, and the like that are customized for an particular entity. In some examples, application 720 may present different data depending on a specialty associated with the entity and protected information associated with the entity. In this manner, application 720 adapts and automatically adjusts depending on the context in which the entity is using the application. In some examples, the data indicates performance statistics for the entity, metrics relating to where the entity falls along a distribution of other similar entities, outlier instances, trends in events or actions, and the like. Application 720 may be configured to receive input, adjust presentations, present unpromoted alerts, adjust display of content, move more relevant content to the foreground, move less relevant content to the background, populate forms for the entity.

In another example, application 722 may be specific for nurses or types of nurses. In this example, application 722 may include dashboards, widgets, windows, icons, and the like that are customized to individual nurses. Similar to the example discussed above pertaining to the doctor, in some examples, application 724 may present different data depending on a position of the nurse. In this manner, application 722 adapts and automatically adjusts depending on the context in which the nurse is using the application. For example, the nurse may receive data, such as test results.

In some examples, application 724 may be a multi-role application for administrators and is used to manage entities constitute the population of the entities or organizations within the interaction system. Similar to the other examples discussed, in some examples, application 724 may present different data depending on a role of the user who is using application 724. In this manner, application 724 adapts and automatically adjusts depending on characteristics of the user who is using application 724. In this manner, application 724 can provide different data depending on the role of the user. For example, whether data presented includes identifiable or de-identified information may depend on a position of the user.

In some examples, application 724 may be a business intelligence application. In this example, application 724 is used to display business information generated by components of the interaction system. This business information can be used for operations, planning, and forecasting. Such business information may include data because such data may impact operations, planning, forecasting, and the like. Accordingly, application 724 may present de-identified information in the form of one or more metrics, indicators, or the like as they pertain to business intelligence.

Applications 716 and 718 shown in connection with interface engine 702 are applications developed by third-parties. In some examples, such applications include any suitable application that benefits from accessing data. The interaction system may include data pertaining to hundreds of thousands of entities. Having data pertaining to so many entities presents security concerns. For example, much of the data may be identifying data. Accordingly, data that may be accessed by applications 716 and 718 may be limited. In some examples, an entity of the interaction system may use one of applications 716, 718 to access his or her own data. In this example, the identity of the entity may be verified in accordance with techniques described herein.

User devices 706-714 are any suitable user devices capable of running applications 716-724. User devices 706-714 are examples of the user device 228. In some examples, the user devices include: mobile phones, tablet computers, laptop computers, wearable mobile devices, desktop computers, set-top boxes, pagers, and other similar user devices. In some examples, at least some of user devices 706-714 are the same devices as at least some of the one or more components 410-418. In some examples, user devices 706-714 may include complementary layers to application/device layer 320 and/or receiving layer 302. For example, user devices 706-714 may include a transmission layer, a generation layer, and/or a receiving layer to communicate data at application/device layer 320 and at receiving layer 302.

Figure 8:
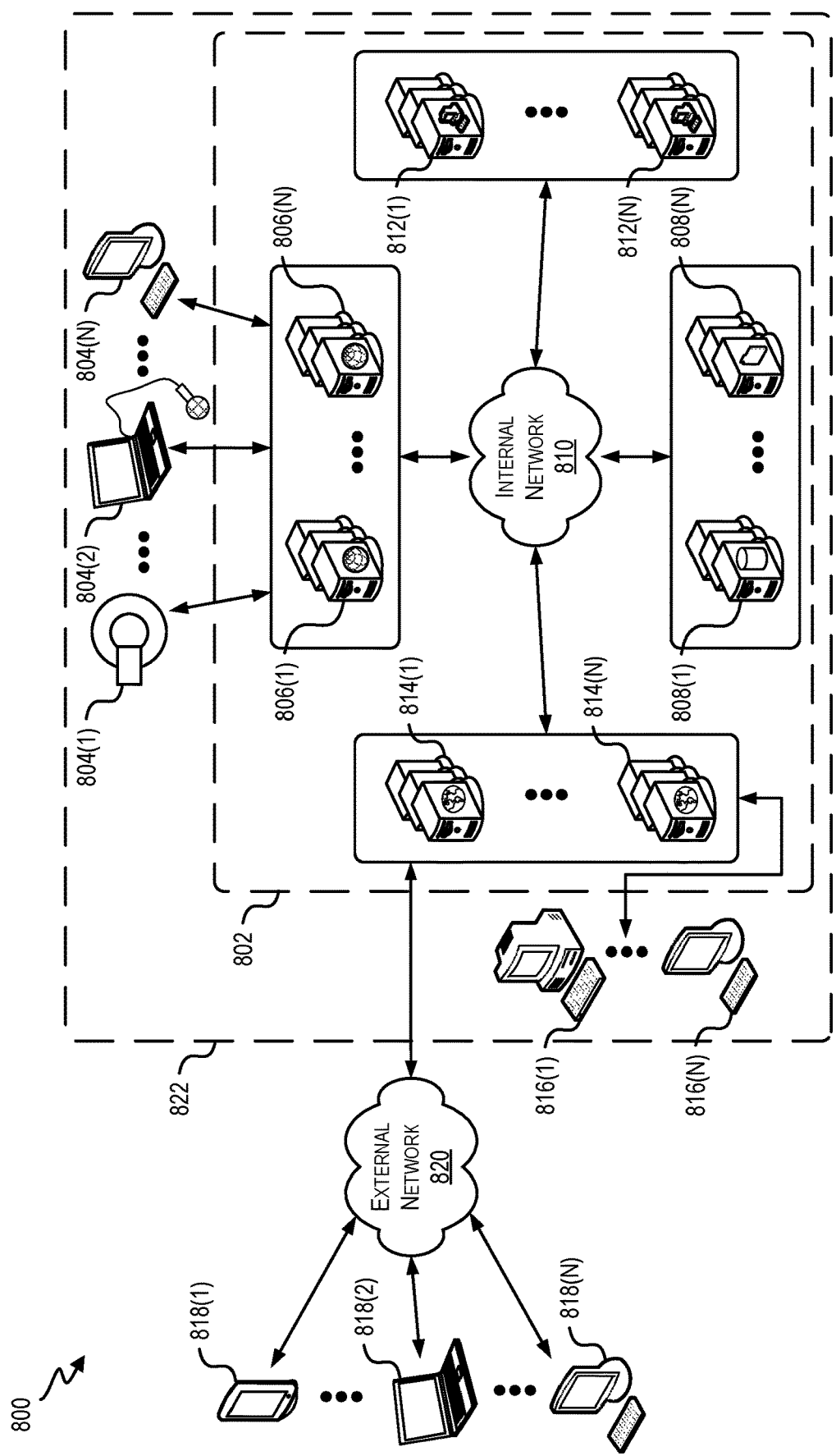
FIG. 8 is an example schematic architecture illustrating a network in which techniques relating to performing randomized searching and recommending of authorized user profiles may be implemented, according to at least one example.

Turning now to FIG. 8, an interaction system 800 is shown in accordance with an example of the invention. Interaction system 800 includes an internal organization 822 including a transformative processing engine 802. The transformative processing engine 802 is an example of transformative processing engine 202 previously discussed. Interaction system 800 is illustrated as an example configuration for implementing the techniques described herein. In particular, a configuration of elements as illustrated in FIG. 8, at least in some examples, communicates according to the layers of architecture stack 300. For example, internal organization 822 includes generation components 804(1), 804(2), and 804(N) which provide data to aggregation servers 806(1)-806(N).

Generation components 804(1), 804(2), and 804(N) operate in accordance with receiving layer 302. In some examples, generation component 804(1) is a piece of equipment, generation component 804(2) is computer with a data collection device, a type of lab system, and generation component 804(N) is a terminal. Aggregation servers 806(1)-806(N) operate in accordance with aggregation layer 304. Aggregation servers 806(1)-806(N) share data with data storage servers 808(1)-808(N) via one or more internal network(s) 810. In some examples, internal network 810 is any suitable network capable of handling transmission of data. For example, internal network 810 may be any suitable combination of wired or wireless networks. In some examples, internal network 810 may include one or more secure networks. Data storage servers 808(1)-808(N) are configured to store data in accordance with active unified data layer 308. Data storage servers 808(1)-808(N) include database servers, file storage servers, and other similar data storage servers.

Access management servers 812(1)-812(N) manage access to the data retained in the data storage servers 808(1)-808(N). Access management servers 812(1)-812(N) communicate with the other elements of interaction system 800 via internal network 810 and in accordance with access management layer 310.

Interface servers 814(1)-814(N) provide one or more interfaces applications to interact with the other elements of interaction system 800. Interface servers 814(1)-814(N) provide the one or more interfaces and communicate with the other elements of interaction system 800 via internal network 810 and in accordance with interface layer 316. The interfaces generated by the interface servers 814(1)-814(N) can be used by internal user devices 816(1)-816(N) and external user devices 818(1), 818(2), and 818(N) to interact with elements of interaction system 800.

Internal user devices 816(1)-816(N) are examples of user devices 706-714. In some examples, internal user devices 816(1)-816(N) run applications via the interfaces generated by interface servers 814(1)-814(N). As an additional example, external user devices 818(1), 818(2), and 818(N) can run applications developed by third parties that access the other elements of interaction system 800 via the interfaces generated by interface servers 814(1)-814(N).

External user devices 818(1), 818(2), and 818(N) access the interfaces via external network 820. In some examples, external network 820 is an unsecured network such as the Internet. External user devices 818(1), 818(2), and 818(N) are examples of user devices 706-714. External user device 818(1) is a mobile device. In some examples, the mobile device may be configured to run an application to access interaction system 800. Similarly, the other external user devices 818(2)-818(N) run applications that enable them to access interaction system 800. While interaction system 800 is shown as implemented using discrete servers, it is understood that it may be implemented using virtual computing resources and/or in a web-based environment.

The environments, systems, networks, models, and the like of FIGS. 1-8 may be used to implement the techniques, system, devices, and processes described herein with respect to later figures. For example, in one example, a randomization searching engine is described that enables searching of authorized users, such as medical professionals (e.g., providers), in a manner that provides randomized results. Such randomization may be desirable when searching databases of authorized users from various organizations, each sharing a unique relationship with the entity running the randomization searching engine. For example, when a new dependent user (e.g., a patient) uses the service to search for a new authorized user, the search results can be bucketized, randomized, segmented, collated, and/or ordered to create a random ordered set of authorized users. If the first authorized user in the list is suitable for the new user dependent user, the new dependent user may select the authorized user and schedule an appointment. The system described herein ensures that search results are compliant with regulations requiring the fair referrals.

The techniques described herein enable inputting of the same search parameters and receiving a set of compliant search results in a different order each time. For example, a user may input a first set of search parameters at time 1, the techniques described herein will present a first list of search results in a first order. If the user inputs the same set of search parameters at time 2, the techniques described herein will present the first list of search results again, but in a different order. Doing so may enable randomized search results to comply with referral regulations. For example, an organization that is acting as a referral agency for many different organizations may be prohibited from giving preferential treatment to members of its own organization. The techniques described herein put all entities (e.g., authorized users) on the same plane.

Once an authorized user has been identified using the searching techniques, the randomization searching engine also provides a common source for reservation of assets (e.g., time, equipment, devices, etc.). At the common source, a scheduler or other end user can view time schedules for many authorized users, even though these time schedules are maintained by the authorized users using different applications and at different locations. The randomization searching engine is capable of establishing connections with these different applications, doing data conversions, and performing other operations to smoothly integrate the different time schedules.

Figure 9:
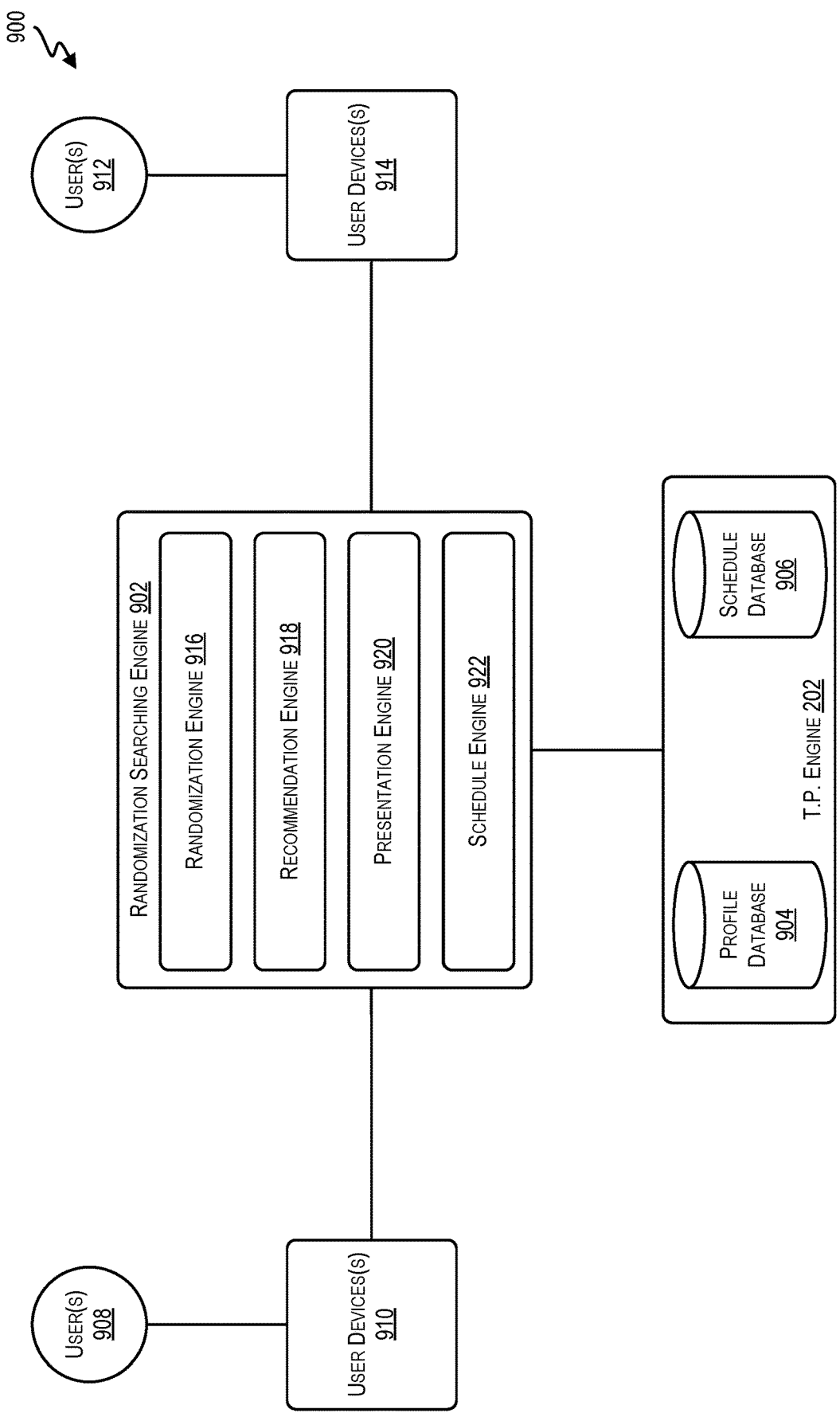
FIG. 9 is an example block diagram illustrating a system in which techniques relating to performing randomized searching and recommending of authorized user profiles may be implemented, according to at least one example.

FIG. 9 illustrates an example block diagram including a system 900 for implementing techniques related to randomized searching. The system 900 includes a randomization searching engine 902, which may be integrated into a scheduling hub. The randomization searching engine 902 is a computer system including one or more memories for storing computer executable instructions (e.g., one or more engines) and one or more processors configured to access the one or more memories and execute the computer executable instructions to perform operations described herein. In some examples, the randomization searching engine 902 is embodied in software and/or hardware that are configured to implement the techniques described herein. The randomization searching engine 902 can be included as an engine or service within the transformative processing engine 202. In this manner, the functionality of the randomization searching engine 902 can be available for an entire enterprise to enable randomized searching of authorized users and community scheduling of authorized users across an entire enterprise. In the illustrated example, a portion of the system 900 (e.g., databases 904 and 906) are included in the transformative processing engine 202, but these databases may also be separate from the transformative processing engine 202.

The randomization searching engine 902 shares connections with one or more internal users 908 via one or more first user devices 910. The internal users 908 are users that are internal to one or more organizations (e.g., that operate the randomization searching engine 902) and, include, for example authorized users (e.g., doctors, nurses, schedulers, and other authorized users). In some examples, at least some of the users 908 are examples of other authorized users discussed herein. The users 908 may each be different users, and in some examples, are the same user. In some examples, the users 908 are associated with a healthcare management system that may be used to manage the administration and operation of one or more facilities. The users 908 utilize on or more interfaces, which may include application programming interfaces and graphical user interfaces presented at the user devices 910, to interact with the randomization searching engine 902. This may enable the users 908, for example, to search through randomized sets of authorized users before referring a particular authorized users to a dependent user (e.g., a user 912 such as a new patient).

Users 912 are examples of dependent users who may use the randomization searching engine 902 to search for and identify a new authorized user. For example, the dependent user 912 may be a new patient searching for a new medical professional. In this example, the user 912 may use a user device 914 to access the randomization searching engine 902 to perform the search. The users 912 utilize one or more interfaces, which may include application programming interfaces and graphical user interfaces presented at the user devices 914, to interact with the randomization searching engine 902. These application programming interfaces, graphical user interfaces, or other such interfaces may be the same as those discussed with reference to user devices 910 or may be different. For example, at the user devices 914 may be presented a simplified version of an interface or one with less functionality than is presented at the user devices 910. The users 908 and 912 access the randomization searching engine 902 via an online portal, application, or some comparable system ("user scheduling application"). The users 908 and 912 utilize the user scheduling application to provide user data to the randomization searching engine 902. The user data may include, for example, user data attributes including, for example, symptoms, reason for visit, procedure request information, insurance attributes, medical history, and other similar attributes related to an appointment for the new dependent user. The data attributes can be input as search parameters for generating search queries.

The user devices 910 and 914 may be any suitable client device such as a laptop computer, a desktop computer, a handheld device, a smartphone, a thin client device, a wearable device, and any other user device.

The randomization searching engine 902 may be configured to manage one or more sub-engines, components, modules, and/or services directed to examples disclosed herein. For example, the randomization searching engine 902 includes a randomization engine 916, a recommendation engine 918, a presentation engine 920, and a schedule engine 922. While these engines are illustrated in FIG. 4 and will be described as performing discrete tasks with reference to the flow charts, it is understood that FIG. 4 illustrates example configurations and other configurations performing other tasks and/or similar tasks as those described herein may be implemented according to the techniques described herein. Other modules, components, engines, and/or services may perform the same tasks as the randomization engine 922, the recommendation engine 918, the presentation engine 920, and the schedule engine 922. Each module, component, or engine may be implemented in software, firmware, hardware, and in any other suitable manner.

The randomization engine 916 is configured to randomize sets of data (e.g., profiles of authorized users). This is done in a way that ensures that no one discrete data set receives prioritized status with respect to any other data sets. For example, a set of authorized user profiles can be randomized using the randomization engine 916. When the set of authorized user profiles is later searched, given a set of search criteria, a first profile is just as likely to be listed as the first result as a second profile.

The recommendation engine 918 is configured to perform searches and make recommendations to the users 908 or 912 to perform. For example, the recommendation engine 918 can recommend authorized users to the users 912 or 908 as search results in response search criteria requests issued from the users 912 and 908.

The presentation engine 920 is configured to present information (e.g., at the user devices 910 and 914) in accordance with techniques described herein. For example, the presentation engine 920 can present search result information as output from the recommendation engine 918. The views in FIGS. 11-18 are examples of output from the presentation engine 920.

The schedule engine 922 is configured to enable community scheduling. For example, the user 908 can configure aspects of the randomization searching engine 902 by utilizing a user interface to provide configuration data to develop and/or manage one or more scheduling rules, which are utilized by the randomization searching engine 902 to facilitate community scheduling. In some examples, the user 908 performs rules management capabilities on the one or more rules, or manages the one or more rules directly via data modifications (e.g., within a relational database table or a comparable data management solution). The one or more scheduling rules are based on inputs of a user, which may be the user 908, made in a native scheduling application, which may be provided by an electronic medical record service. For example, when the user 908 is a care provider, the user 908 uses the native scheduling application to manage her own medical schedule, including setting appointment types and duration of appointment types. The native scheduling application is independent of the randomization searching engine 902 and may include the software used by the user 908 to manage appointment schedules and other details pertaining to the care organization to which the user 908 belongs. In some examples, the user 908 accesses the randomization searching engine 902 via an interface to manage and/or determine rules based on information provided by the native scheduling application.

As introduced herein, the randomization searching engine 902 includes the profile database 904 and the schedule database 906. The databases 904 and 906 can be included in separate datastore, within a datastore of the transformative processing engine 202, and/or stored in any suitable manner.

The profile database 904 includes profile information for authorized users. In some examples, the profile information is stored as a set of authorized users data attributes such as specialty, dependent user-type preferences, referral status, years in practice, facility affiliations, locations, and any other suitable attribute relating to authorized user profiles. In some examples, these authorized user data attributes are used in conjunction with other configurations and the one or more scheduling rules to derive and surface abstractions of schedules in the randomization searching engine 902 for presentation to consumers, dependent users, healthcare staff, and others desiring to schedule an appointment.

The schedule database 906 includes schedule data relating corresponding to the authorized users. In some examples, a schedule is an abstraction, or representation, of a time period (or a series of time periods) that considers attributes related to, but not limited to: the dependent user, the provider/set of providers/practice (or other abstraction of the authorized user), a facility, classification of time periods/slots and associated durations within the authorized users' (e.g., one of the users 908 and 912) native scheduling application. In some examples, one or more scheduling rules are established for and can be applied to, or "sit on top of", this combined set of data directly. In some examples, the one or more scheduling rules are applied to the concept of schedule maintenance via at least one of the following parameters: scheduling actions, schedule duration, schedule start rules, schedule hours of operation, schedule display exclusion rules, schedule external access, schedule consuming exclusion rules. Schedule maintenance may include: actions resulting in view, consume, modify, delete transaction types in the randomization searching engine 902 that will impact transactions interfaced to the authorized users management systems.

Figure 10:
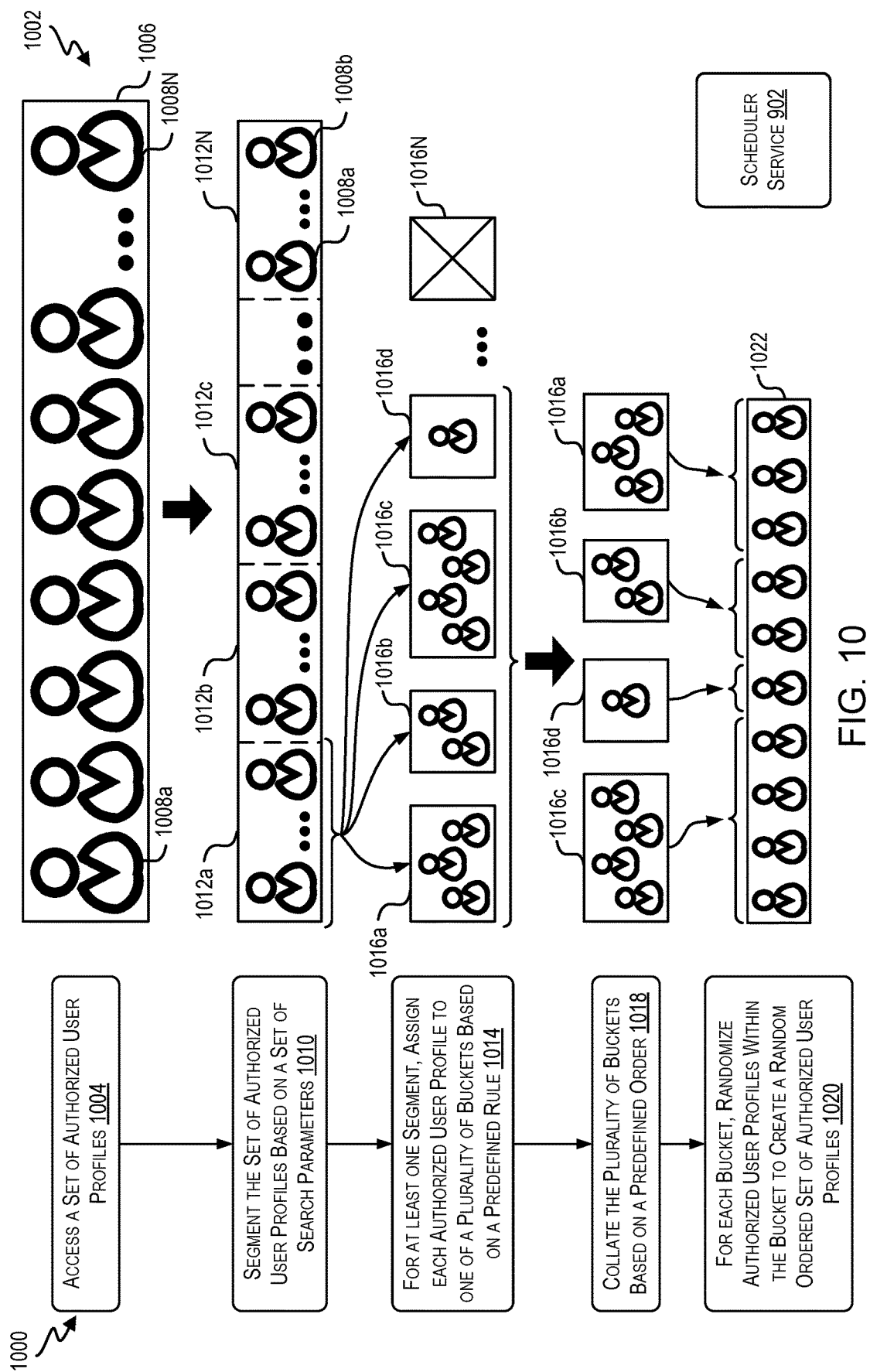
FIG. 10 is an example block diagram and process flow illustrating techniques relating to performing randomized searching and recommending of authorized user profiles, according to at least one example.

FIG. 10 illustrates a simplified block diagram 1002 and an example process flow 1000 for generating a randomized data set of authorized user profiles, according to at least one example. The process 1000 is performed by the randomization searching engine 902.

The process 1002 begins at 1004 by accessing a set of authorized user profiles. The set of authorized user profiles 1006 may include individual profiles 1008a-1008N and may be stored in the profile database 904. In some examples, the set of authorized user profiles 1006 is accessed from one or more electronic health record applications. For example, the profiles 1008 of the authorized users may be maintained at a plurality of different locations using the same or different versions and/or types of electronic health record applications. In this example, the block 1004 may include accessing the profiles 1008 from the different locations in order to build the set 1006. In some examples, the set of authorized user profiles 1006 may be maintained at a central location (e.g., as part of a transformative processing engine 202 or other clinical data warehouse).

At 1010, the process 1000 includes segmenting the set of authorized user profiles 1006 based on a set of search parameters. This action may create a plurality of profile segments 1012a-1012N. Each profile segment 1012 can include one or more profiles 1008. In some examples, the number of profile segments 1012 is fixed and/or may be dynamic based on the search parameters and/or the number of profiles 1008 in the set of profiles 1006.

Segmenting the set of authorized user profiles 1006 based on the set of search parameters indicates that certain segments 1012 may be more relevant to the search parameters than others. For example, the segment 1012a may be the most relevant to the search parameters and the segment 1012c may be less relevant. In some examples, the set of authorized user profiles 1006 is ranked based on the search parameters and then assigned to the segments 1012.

The search parameters can be input by a user who uses the techniques described herein to obtain a recommendation of an authorized user in a randomized manner. For example, one of the users 908 or 912 may use one of the user devices 910 or 914 to input the search parameters. Thus, in some examples, the process 1000 may include receiving the search parameters from the user devices 910 or 914.

At 1014, the process 1000 includes, for at least one segment (e.g., the segment 1012a), assigning each authorized user profile 1008 to one of a plurality of buckets 1016 based on a predefined rule. Each bucket 1016 can include one or more authorized user profiles 1008. The predefined rule may include a set of predefined rules and may include conditions such as, for example, whether the authorized user permits online scheduling, whether the authorized user is taking new dependent users, whether they are employed by a particular organization, other enhanced capabilities, and any other suitable parameter.

In some examples, the buckets 1016 may be defined as categories to include those authorized user profiles 1008 that meet all of the conditions of the predefined rule or set of rules. For example, if the predefined rule indicates that online scheduling is allowed, then two buckets 1016 will be created and the authorized user profiles 1008 will be assigned to one of the two buckets 1016, online scheduling allowed or online scheduling not allowed. If the predefined rule were to include more than one condition, more than two buckets 1016 will be created. For example, if the predefined rule were online scheduling allowed and member of an organization, then a first bucket 1016 can include all profiles 1008 that allow online scheduling and are members of the organization, a second bucket 1016 can include all profiles 1018 that do neither, a third buck 1016 can include all profiles 1018 that allow online scheduling but are not members of the organization, and a fourth bucket can include all profiles 1018 that do not allow online scheduling but are members of the organization. Many additional and different permutations can exist, depending on the conditions. Other conditions for bucketizing can include courtesy and eligibility, which may relate to an authorized user's status within an organization. In some examples, each bucket 1016 of the plurality of category buckets corresponds to one category type from a set of category types including an associated user with a scheduling category type (e.g., allows online scheduling), an associated user with a first status category type (e.g., member of organization), an associated user with a second status category type (e.g., not a member of the organization), a scheduling category type (e.g., does not allow online scheduling), a first status category type (e.g., eligibility), a second status category type (e.g., courtesy), an unassociated user category type, or an unknown category type.

At 1018, the process 1000 includes collating the plurality of buckets 1016 based on a predefined order. In some examples, the predefined order may correspond to a priority assigned to each of the buckets. In this manner, certain ones of the authorized user profiles 1008 may obtain priority over others.

At 1020, the process 1000 includes, for each bucket, randomizing authorized user profiles within the bucket to create a random ordered set of authorized user profiles 1022. In this manner, the bucketized authorized user profiles 1008 can be put into a random order such that no authorized user profile is of higher priority than the next. In some examples, the random ordered set 1022 may be presented at a user device in response to a request to perform the process 1000. For example, a user may initiate a search using the process 1000, and the portion that is surfaced to the user may be the random ordered set 1022.

FIGS. 11-17 illustrate example views 1100-1700 of a graphical user interface for use in enabling a randomized search for an authorized user. The views 1100-1700 may be particularly relevant when a searching user searches for an authorized user on behalf of a potential new dependent user. For example, the searching user may work in a call center that handles incoming calls from potential new dependent users. In this example, the searching user can use the system described herein to perform randomized searches of authorized user and make such recommendations as appropriate.

FIG. 11 illustrates the view 1100 for initiating a randomized search for an authorized user, according to at least one example. The view 1100 includes a plurality of fields at which can be input a plurality of search parameters. In particular, the view 1100 includes a provider information area 1102 and an appointment information area 1104. The provider information area 1102 includes fields for inputting search parameters relating to providers (e.g., authorized users) ("provider fields"). All of the provider fields may map to data parameters of the authorized user profiles as described herein. Thus, a complete authorized user profile may include data that corresponds to each of the provider fields. The provider fields can enable searching by name, specialty, particular profile details (e.g., language, education, gender, etc.), facility name at which the authorized user practices, a location where the authorized user practices, proximity with respect to some known geographic location or area, and by other parameters.

In some examples, each provider field may be associated with a relevancy indicator. The relevancy indicator can indicate high relevance, medium relevance, low relevance, or any other value of relevance. For example, the provider first and last name fields may have a high relevancy indicator, specialty field and profile information fields may have a medium relevancy indicator, and the facility field and other similar fields may have a low relevancy indicator. When data is entered in these fields, it may be given the assigned relevancy value associated with the field.

Figure 12:
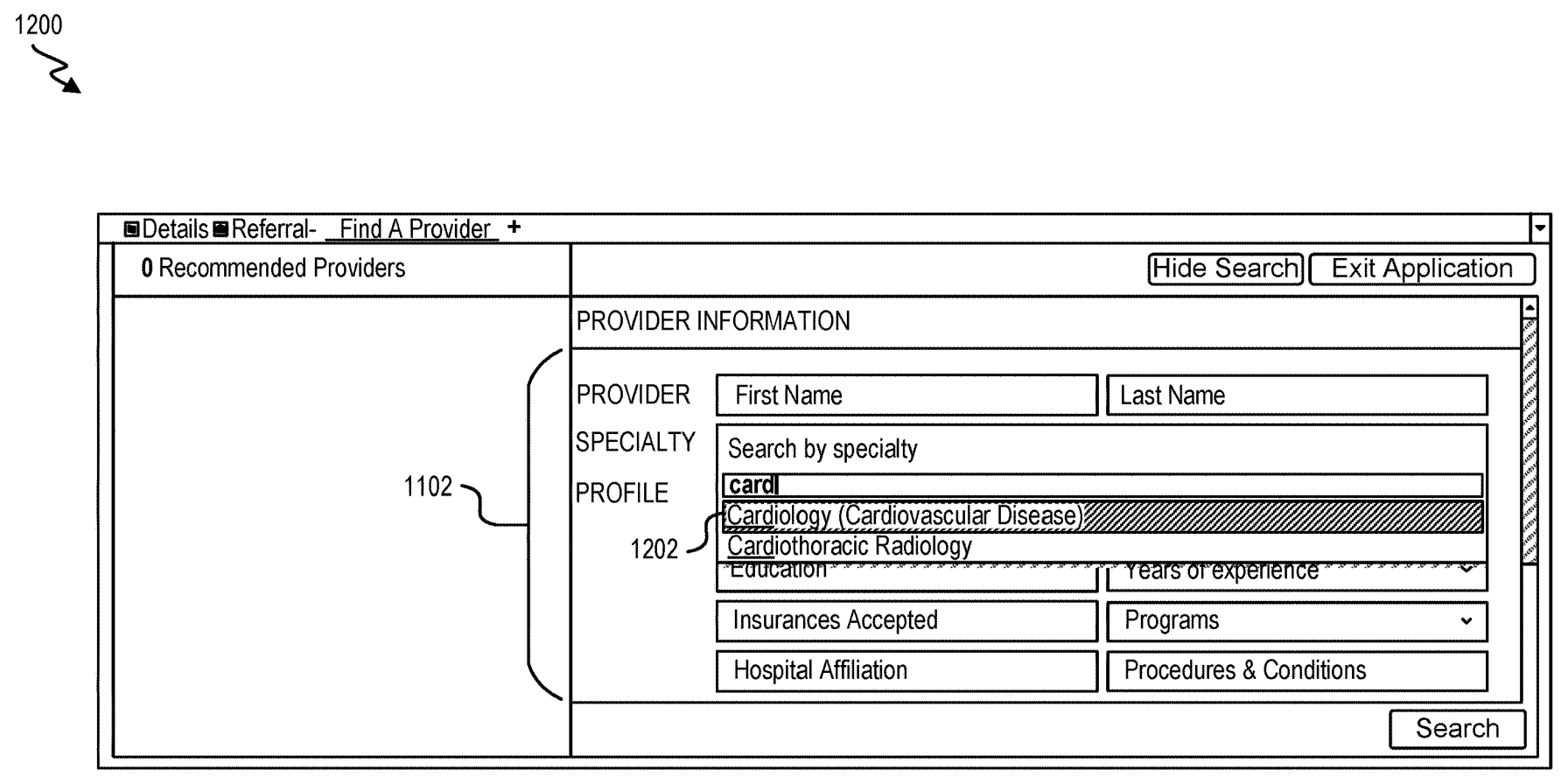

FIG. 12 illustrates the view 1200 depicting a detailed view of the particular profile fields of the view 1100, according to at least one example. In this example, a search is beginning to be initialized. In particular, as the user begins to input "card," the system begins searching the profiles of all relevant authorized users to auto-populate a list 1202 of potential procedures. For example, if the new dependent user was interested in seeing an authorized user about a particular condition (e.g., cardiovascular disease), the condition can be inputted and selected using this field.

Returning to FIG. 11, the appointment information area 1104 includes fields for inputting search parameters relating to details of a requested appointment. For example, these fields may correspond dates and times when the potential new dependent user is available. Once the searching user has added data to one or more of the fields (e.g., inputted at least one search parameter), a search may be executed.

Figure 13:
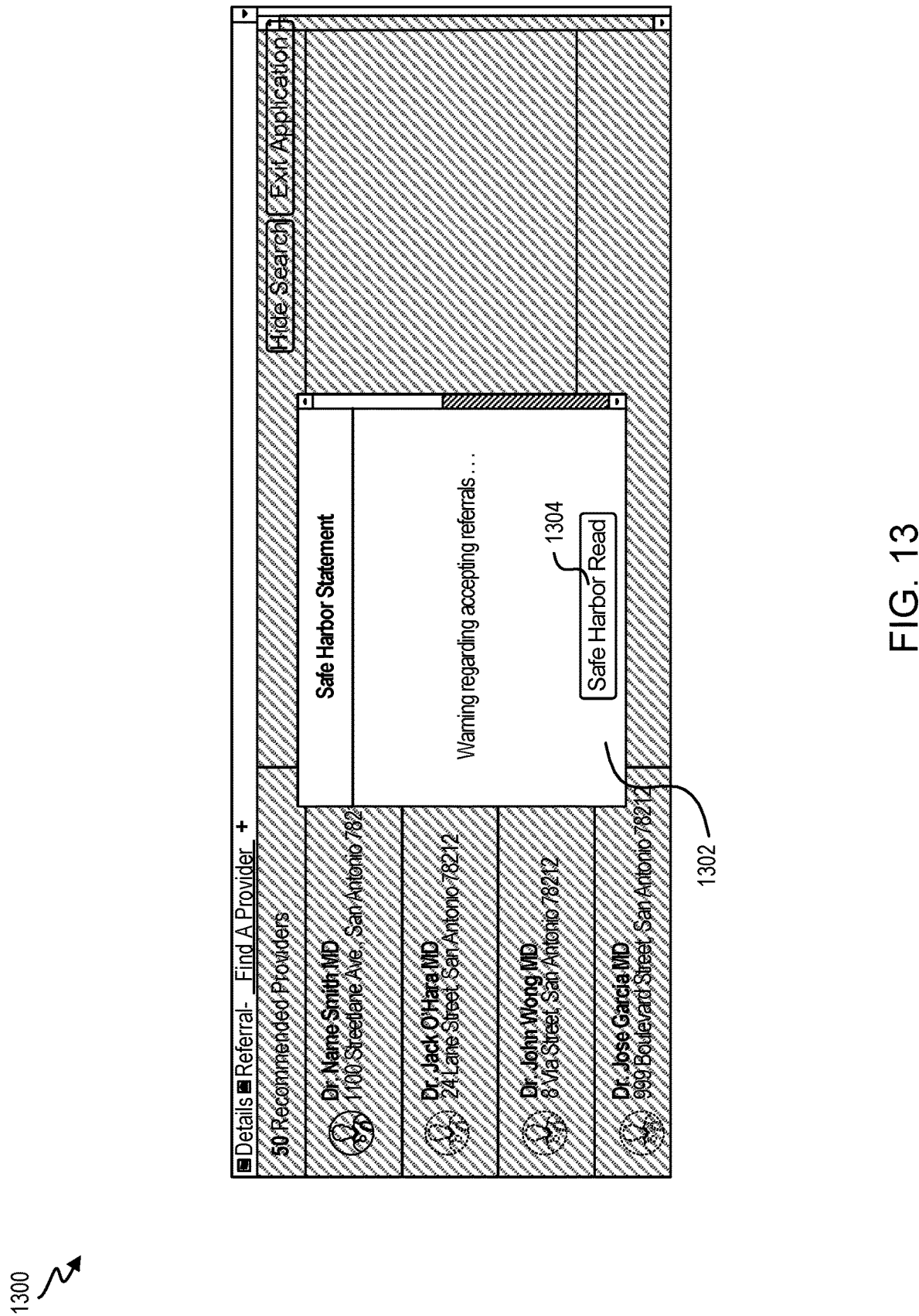
FIG. 13 is an example view relating to implementing techniques relating to performing randomized searching and recommending of authorized user profiles, according to at least one example.

FIG. 13 illustrates the view 1300 depicting a warning window 1302, according to at least one example. The warning window 1302 can include text relating to a warning about making referrals using the system described herein. In some examples, a user must indicate that she agrees with and/or has read the text. This may be done by selecting a button 1304. In some examples, the text may represent a compliance statement that provides that the entity or organization that is providing the searching does so on fair and equal terms.

Figure 14:
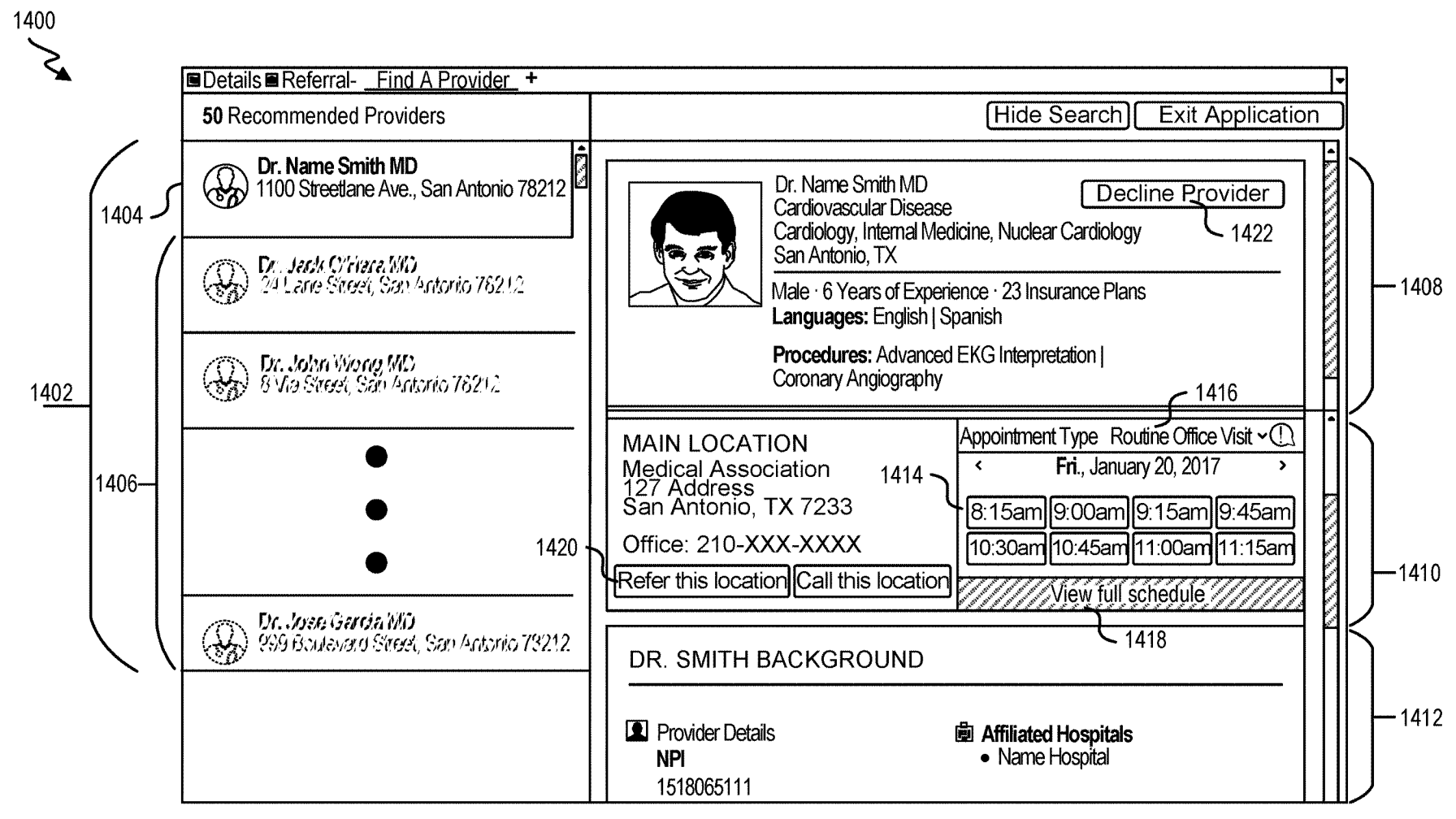

FIG. 14 illustrates the view 1400 depicting search results 1402, according to at least one example. The search results 1402 may be populated using the process 1000 described herein. In particular, the search results 1402 may correspond to the random ordered set of authorized user profiles 1022. The search results 1402 may depict a first profile 1404 using first formatting and other profiles 1406 using different formatting. In particular, the first profile 1404 may be selected and visible, while the other profiles 1406 may be grayed out and/or unselectable. The first profile 1402 may correspond to Dr. Name Smith.

The first profile 1404 corresponds to a first randomly selected authorized user profile from the random ordered set of authorized user profiles 1022. Information about the first profile 1404 is presented in the right-hand side of the view 1400. In particular summary information is presented in a profile summary section 1408, scheduling information is presented in a scheduling section 1410, and background information is presented in a background section 1412. The summary information from the summary section 1408 may identify data from the first profile 1404 at a first level of granularity. If the searching user desires to learn more about the authorized user, the background information in the background section 1412 may be accessed by clicking, scrolling, and otherwise interacting with links and other content in the background section 1412.

The scheduling section 1410 includes available time slots 1414 for scheduling with the authorized user identified above. The available time slots 1414 may be pulled from a local scheduling application associated with the authorized user and/or associated with the location, "Medical Association" with which the authorized user is associated. If desired, selection of one of the available time slots 1414 will enable automatic scheduling with the authorized user. The available time slots may be computed based on a selected appointment type 1416. For example, as described herein, the authorized user may identify the types of appointments, lengths for different types, blackout periods, etc. relating to their own schedule. The system described herein computes the available time slots based at least in part on this information and other schedule generation rules. If the searching user desires to learn more about the authorized user's schedule, she may select a button, e.g., "view full schedule" 1416 to view additional available time slots. Selection of any one of the available time slots 1414 will automatically place an appointment on the authorized user's schedule. In some examples, the authorized user or a different user associated with the authorized user has the option to review the schedule request prior to the available time slot being reserved.

If the searching user does not desire to schedule the appointment, but is nevertheless interested in the authorized user, she can refer the Medical Association and/or the authorized user by selecting a "refer this location" button 1420. For example, this may desirable when the searching user is a scheduler working with a potential new dependent user. Making this selection will cause the system to send a referral to the Medical Association, send the Medical Association's information to the potential new dependent user, and/or connect the potential new dependent user with a representative of the medical association (e.g. in a phone call) to answer questions and/or schedule the appointment.

FIG. 15 illustrates the view 1500 including referral window 1502 is presented in response to the searching user selecting the button 1420. Using the referral window 1502, the searching user can input additional information about the potential new dependent user relating to why they are seeking the referral. This may information may be helpful for the authorized user to determine how to contact the potential new dependent user.

Returning to FIG. 14, if the searching user does not desire to schedule with the authorized user and/or refer the location, the searching user can decline authorized user by selecting decline button 1422. Selection of the decline button 1422 causes the system to present the view 1600 relating to the next authorized user, Dr. Jack O'Hara.

Figure 16:
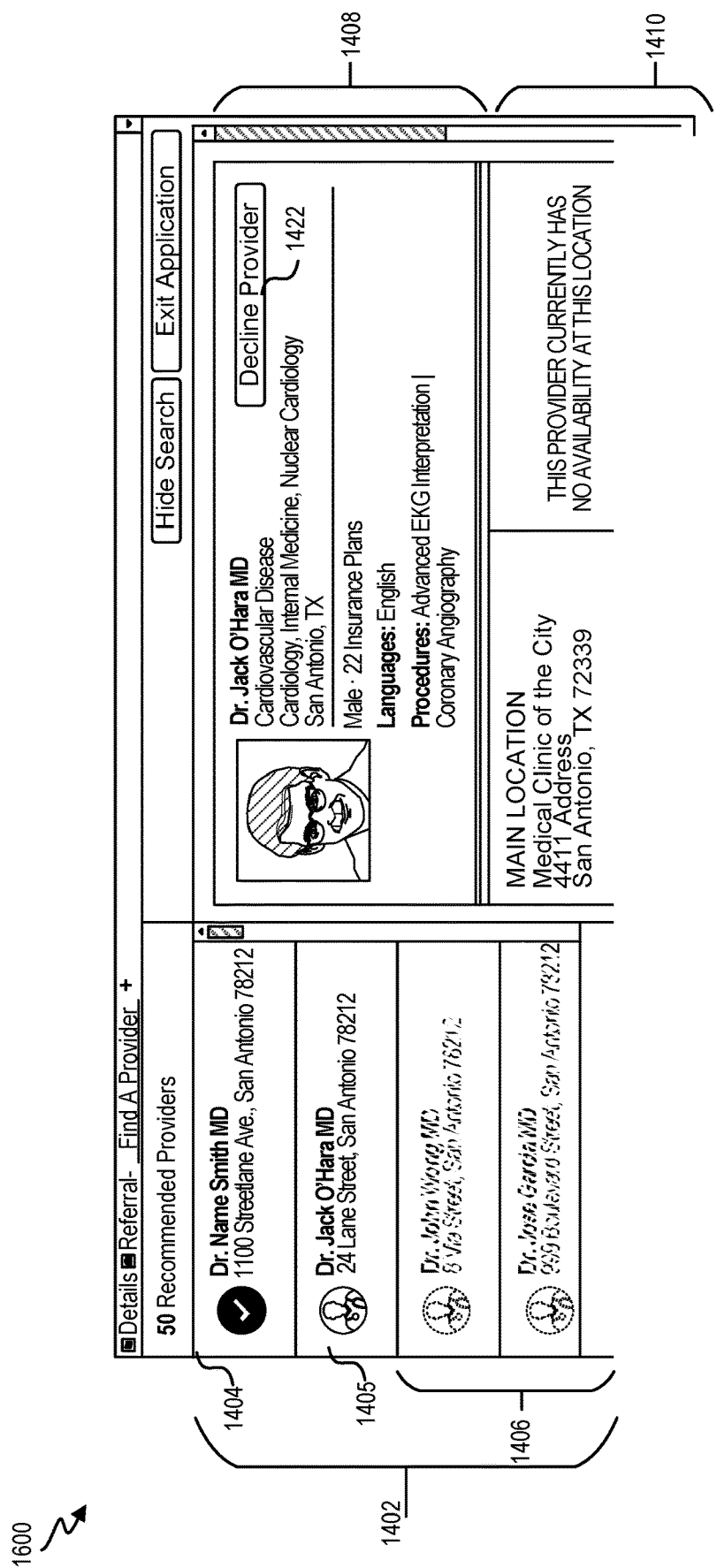
FIG. 16 is an example view relating to implementing techniques relating to performing randomized searching and recommending of authorized user profiles, according to at least one example.

FIG. 16 illustrates the view 1600 depicting search results 1402, according to at least one example. The search results 1402 may be populated using the process 1000 described herein. In particular, the search results 1402 may correspond to the random ordered set of authorized user profiles 1022. The search results 1402 may depict the first profile 1404 using first formatting, a second profile 1405 using second formatting, and other profiles 1406 using different formatting. In particular, the second profile 1405 may be selected and visible, while the other profiles 1406 may be grayed out and/or unselectable. The first profile 1404 may include a check mark or other indicator representing that the first profile 1404 has been evaluated (e.g., referred or declined). The first profile 1404 may correspond to Dr. Name Smith, discussed with reference to FIGS. 14 and 15. The second profile 1405 may correspond to D. Jack O'Hara. He may be the next authorized user in the search results 1402. Thus, information about the second profile 1405 may be presented in sections 1408 and 1410 similarly as discussed with reference to FIG. 14. Thus, the searching user can read more about the authorized user, schedule an appointment, refer the authorized user, and perform any other action described herein. Likewise, if the searching user does not desire to schedule with the authorized user and/or refer the location, the searching user can decline authorized user by selecting the decline button 1422. Selection of the decline button 1422 in the view 1600 causes the system to present a different view in which information about the next authorized user, Dr. John Wong, is presented.

Figure 17:
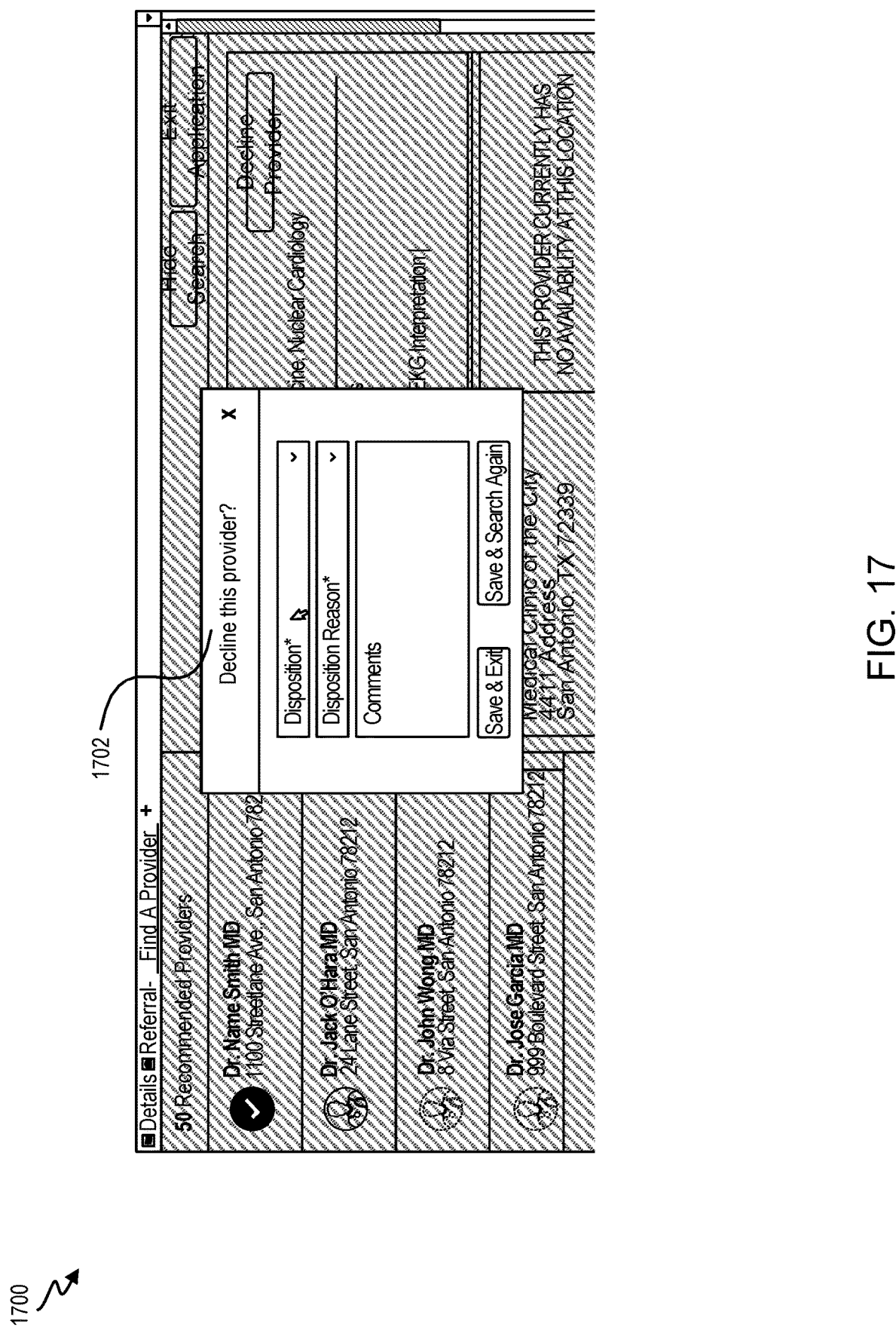
FIG. 17 is an example view relating to implementing techniques relating to performing randomized searching and recommending of authorized user profiles, according to at least one example.

FIG. 17 illustrates the view 1700 including declining window 1702, which is presented in response to the searching user selecting the button 1422. Using the declining window 1702, the searching user can input additional information about why the authorized user was declined. This information may be helpful for the authorized user and/or the system to make better recommendations in the future.

Figure 18:
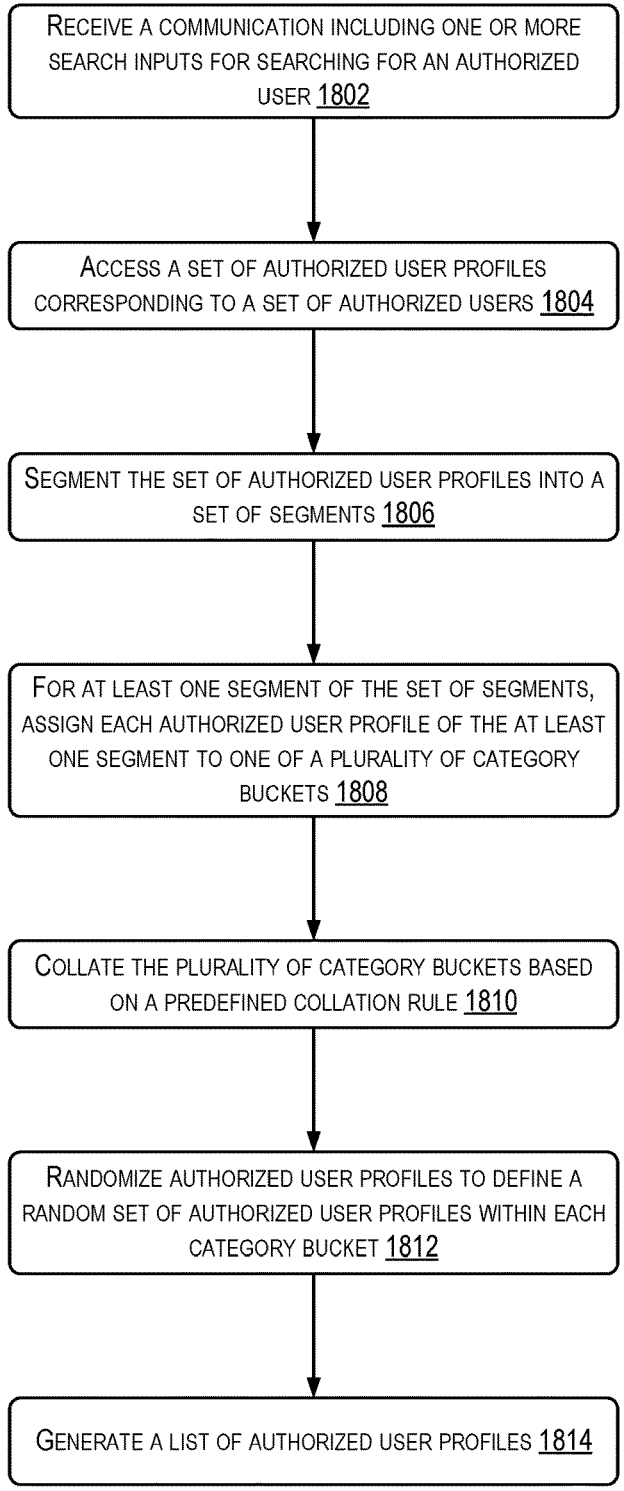
FIG. 18 is a flow diagram depicting example acts for implementing techniques relating to performing randomized searching and recommending of authorized user profiles, according to at least one example.

FIG. 18 depicts process 1800 including example acts or techniques relating to generating a random set of authorized user profiles, according to at least one example. Some or all of the process 1800 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The randomization searching engine 902 (FIG. 9) may perform the process 1800 of FIG. 18. The process 1800 begins at 1802 receiving a communication including one or more search inputs for searching for an authorized user. The communication is received from a user device. The one or more search inputs are input by a user of the user device at one or more search input fields of a search input interface presented at the user device. In some examples, each search input field of the one or more search input fields is associated with one of at least a high relevancy indicator, a medium relevancy indicator, or a low relevancy indicator.

At 1804, the process 1800 accesses a set of authorized user profiles corresponding to a set of authorized users. The set of authorized user profiles may be stored in a profile database including authorized user profiles sourced from a plurality of different source locations.

At 1806, the process 1800 segments the set of authorized user profiles into a set of segments. This may be based on the one or more search inputs. The set of segments can be defined in part by relevancy of the set of authorized user profiles to the one or more search inputs.

At 1808, the process 1800, for at least one segment of the set of segments, assign each authorized user profile of the least one segment to one of a plurality of category buckets. This may be based at least in part on a predefined categorization rule. The predefined categorization rule may indicate properties of the segments that must be present in order for a particular segment to be categorized. The predefined categorization rule defines associations between the category types of the set of category types and category data attributes of the authorized user profiles.

At 1810, the process 1800 collates the plurality of category buckets based on a predefined collation rule. This may be performed in order to define a collated plurality of category buckets. The predefined collation rule may indicate properties of the category buckets that are used to collate the category buckets.

At 1812, the process 1800 randomizes authorized user profiles to define a random set of authorized user profiles within each category bucket. This may be performed within each category bucket of the collated plurality of category buckets. In some examples, each category bucket of the plurality of category buckets corresponds to one category type from a set of category types including an associated user with scheduling category type, an associated user with a first status category type, an associated user with a second status category type, a scheduling category type, a first status category type, a second status category type, an unassociated user category type, or an unknown category type.

At 1814, the process 1800 generates a list of authorized user profiles. The list of authorized user profiles can include the random sets of authorized user profiles from the collated plurality of category buckets.

In some examples, the process 1800 further includes providing the list of authorized user profiles for presentation at a search results interface at the user device. The search results interface is configured to present an first authorized user profile of the list authorized user profiles according to a selectable format. The interface is also configured to present first authorized user profile data associated with the first authorized user profile. The interface is also configured to present a second authorized user profile of the list of authorized user profiles according to a unselectable format.

In some examples, the process 1800 further includes receiving a request to decline the first authorized user profile. The process 1800 further includes, in response to receiving the request to decline the first authorized user profile, causing the search results interface to present the second authorized user profile of the list of authorized user profiles according to the selectable format. A second authorized user profile data can be associated with the second authorized user profile. Other authorized user profiles of the list of authorized user profiles can be presented according to the unselectable format.

In some examples, the process 1800 further includes receiving a request to refer a first authorized user to whom the first authorized user profile belongs. In this example, the process 1800 further includes, in response to receiving the request to refer the first authorized user, causing the search results interface to present: the first authorized user profile of the list of authorized user profiles according to a different version of the selectable format, the second authorized user profile of the list of authorized user profiles according to the selectable format, and second authorized user profile data associated with the second authorized user profile.

In some examples, the process 1800 further includes receiving a request to schedule an appointment with a first authorized user to whom the first authorized user profile belongs. The request may be received in response to user selection of an scheduling button.

In some examples, the process 1800 further includes providing a compliance statement for presentation at the user device in response to receiving the communication, and providing the list of authorized user profiles for presentation at a search results interface at the user device in response to receiving an acknowledgment from the user device that a user has acknowledged the compliance statement.

Specific details are given in the above description to provide a thorough understanding of the examples. However, it is understood that the examples may be practiced without these specific details. For example, circuits may be shown in block diagrams in order not to obscure the examples in unnecessary detail. In other instances, well-known circuits, processes, algorithms, structures, and techniques may be shown without unnecessary detail in order to avoid obscuring the examples.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the examples may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, examples may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system, comprising:
a memory comprising computer-executable instructions; and
a processor configured to access the memory and execute the computer-executable instructions to perform operations comprising:
providing for presentation at a user device a search interface view of a provider search interface, the search interface view comprising one or more search input fields, individual search input fields of the one or more search input fields being associated with one or more relevancy indicators;
receiving, from the user device, a communication comprising one or more search inputs for searching for a healthcare provider, the one or more search inputs input at the one or more search input fields of the search interface view presented at the user device;
performing a randomized search by at least:
accessing, from a profile database in network communication with the system, a set of healthcare provider profiles corresponding to a set of healthcare providers based on the one or more search inputs;
segmenting the set of healthcare provider profiles into a set of segments by at least:
performing a ranking of each healthcare provider profile of the set of healthcare provider profiles based on relevancy of the respective healthcare provider profile based on the one or more respective relevancy indicators; and
assigning each ranked healthcare provider profile to a segment of the set of segments based on the ranking, wherein a first segment of the set of segments comprises healthcare provider profiles that are more relevant than health care provider profiles in a second segment of the set of segments;
generating a randomized list of healthcare provider profiles by randomizing an order of the ranked healthcare provider profiles of the first segment of the set of segments;
selecting a first healthcare provider profile from the randomized list of healthcare provider profiles;
providing for presentation at the user device a search results view of the provider search interface, the search results view comprising:

the first healthcare provider profile of the randomized list of healthcare provider profiles in a selectable format; and a next healthcare provider profile of the randomized list of healthcare providers profiles in an unselectable format;

receiving, at the search results view, a user selection that dismisses the first healthcare provider profile; and automatically updating the provider search interface to present the search results view to comprise:

the next healthcare provider profile in the selectable format; and additional healthcare provider profiles that follow the next healthcare provider profile in the randomized list of healthcare provider profiles in the unselectable format.

2. The system of claim 1, wherein the search results view further comprises a plurality of predefined graphical sections comprising at least a profile summary section, a scheduling section, and a background section.

3. The system of claim 2, wherein the search results view further comprises a plurality of user input elements comprising at least a first graphical element for declining a healthcare provider represented by the first healthcare provider profile, a second graphical element for scheduling an appointment with the healthcare provider.

4. The system of claim 1, wherein:

performing the randomized search further comprises:
for at least one segment of the set of segments, assigning each healthcare provider profile of the at least one segment to one of a plurality of category buckets based on a predefined categorization rule; and collating the plurality of category buckets based on a predefined order to define a collated plurality of category buckets; and generating the randomized list of healthcare provider profiles comprises, within each category bucket of the collated plurality of category buckets, randomizing the healthcare provider profiles to define the randomized list of healthcare provider profiles.

5. The system of claim 4, wherein the predefined categorization rule defines one or more conditions that are fulfillable by category data attributes of the set of healthcare provider profiles.

6. A computer-implemented method, comprising:

providing for presentation at a user device a search interface view of a provider search interface, the search interface view comprising one or more search input fields, individual search input fields of the one or more search input fields being associated with one or more relevancy indicators;

receiving, from the user device, a communication comprising one or more search inputs for searching for a healthcare provider, the one or more search inputs input at the one or more search input fields of the search interface view presented at the user device;

performing a randomized search by at least:
accessing, from a profile database, a set of healthcare provider profiles corresponding to a set of healthcare providers based on the one or more search inputs;

segmenting the set of healthcare provider profiles into a set of segments by at least:

performing a ranking of each healthcare provider profile of the set of healthcare provider profiles based on relevancy of the respective healthcare provider profile based on the one or more respective relevancy indicators; and assigning each ranked healthcare provider profile to a segment of the set of segments based on the ranking, wherein a first segment of the set of segments comprises healthcare provider profiles that are more relevant than health care provider profiles in a second segment of the set of segments;

generating a randomized list of healthcare provider profiles by randomizing an order of the ranked healthcare provider profiles of the first segment of the set of segments;

selecting a first healthcare provider profile from the randomized list of healthcare provider profiles;

providing for presentation at the user device a search results view of the provider search interface, the search results view comprising:

the first healthcare provider profile of the randomized list of healthcare provider profiles in a selectable format; and a next healthcare provider profile of the randomized list of healthcare providers profiles in an unselectable format;

receiving, at the search results view, a user selection that dismisses the first healthcare provider profile; and automatically updating the provider search interface to present the search results view to comprise:

the next healthcare provider profile in the selectable format; and additional healthcare provider profiles that follow the next healthcare provider profile in the randomized list of healthcare provider profiles in the unselectable format.

7. The computer-implemented method of claim 6, wherein a second healthcare provider profile of the additional healthcare provider profiles of the randomized list of healthcare provider profiles is configured to change from the unselectable format to the selectable format only after the next healthcare provider profile has been dismissed.

8. The computer-implemented method of claim 6, wherein the search results view further comprises a plurality of predefined graphical sections comprising at least a profile summary section, a scheduling section, and a background section.

9. The computer-implemented method of claim 8, wherein the search results view further comprises a plurality of user input elements comprising at least a first graphical element for dismissing a healthcare provider represented by the first healthcare provider profile, a second graphical element for scheduling an appointment with the healthcare provider.

10. The computer-implemented method of claim 6, wherein an updated search results view presents other healthcare provider profiles of the randomized list of healthcare provider profiles according to the unselectable format.

11. The computer-implemented method of claim 6, wherein:

performing the randomized search further comprises:
for at least one segment of the set of segments, assigning each healthcare provider profile of the at least one segment to one of a plurality of category buckets based on a predefined categorization rule; and collating the plurality of category buckets based on a predefined order to define a collated plurality of category buckets; and generating the randomized list of healthcare provider profiles comprises, within each category bucket of the collated plurality of category buckets, randomizing the healthcare provider profiles to define the randomized list of healthcare provider profiles.

12. The computer-implemented method of claim 11, wherein
the predefined categorization rule defines one or more conditions that are fulfillable by category data attributes of the set of healthcare provider profiles.

13. The computer-implemented method of claim 11, wherein the predefined order corresponds to a priority assigned to each category bucket of the plurality of category buckets based on the category data attributes.

14. The computer-implemented method of claim 11, wherein:
randomizing the healthcare provider profiles to define the list of healthcare provider profiles comprises defining a randomized subset of healthcare provider profiles within each category bucket; and
the computer-implemented method further comprises defining the randomized list of healthcare provider profiles by combining the randomized subset of healthcare provider profiles from the collated plurality of category buckets.

15. One or more computer-readable storage devices comprising computer-executable instructions that, when executed by one or more computer systems, configure the computer systems to perform operations comprising:
providing for presentation at a user device a search interface view of a provider search interface, the search interface view comprising one or more search input fields, individual search input fields of the one or more search input fields being associated with one or more relevancy indicators;
receiving, from the user device, a communication comprising one or more search inputs for searching for a healthcare provider, the one or more search inputs input at the one or more search input fields of the search interface view presented at the user device;
performing a randomized search by at least:
accessing, from a profile database, a set of healthcare provider profiles corresponding to a set of healthcare providers based on the one or more search inputs;
segmenting the set of healthcare provider profiles into a set of segments by at least:
performing a ranking of each healthcare provider profile of the set of healthcare provider profiles based on relevancy of the respective healthcare provider profile based on the one or more respective relevancy indicators; and
assigning each ranked healthcare provider profile to a segment of the set of segments based on the ranking, wherein a first segment of the set of segments comprises healthcare provider profiles that are more relevant than health care provider profiles in a second segment of the set of segments;
generating a randomized list of healthcare provider profiles by randomizing an order of the ranked healthcare provider profiles of the first segment of the set of segments;
selecting a first healthcare provider profile from the randomized list of healthcare provider profiles; and
providing for presentation at the user device a search results view of the provider search interface, the search results view comprising:
the first healthcare provider profile of the randomized list of healthcare provider profiles in a selectable format; and
a next healthcare provider profile of the randomized list of healthcare providers profiles in an unselectable format;
receiving, at the search results view, a user selection that dismisses the first healthcare provider profile; and
automatically updating the provider search interface to present the search results view to comprise:
the next healthcare provider profile in the selectable format; and
additional healthcare provider profiles that follow the next healthcare provider profile in the randomized list of healthcare provider profiles in the unselectable format.

16. The one or more computer-readable storage devices of claim 15, wherein:
performing the randomized search further comprises:
for at least one segment of the set of segments, assigning each healthcare provider profile of the at least one segment to one of a plurality of category buckets based on a predefined categorization rule; and
collating the plurality of category buckets based on a predefined order to define a collated plurality of category buckets; and
generating the randomized list of healthcare provider profiles comprises, within each category bucket of the collated plurality of category buckets, randomizing the healthcare provider profiles to define the randomized list of healthcare provider profiles.

* * * * *